US012631890B2

(12) United States Patent
Gaides et al.

(10) Patent No.: US 12,631,890 B2
(45) Date of Patent: May 19, 2026

(54) LIGHT CONTROL FILM

(71) Applicant: 3M INNOVATIVE PROPERTIES COMPANY, St. Paul, MN (US)

(72) Inventors: Gary E. Gaides, Woodbury, MN (US); Nicholas A. Johnson, Burnsville, MN (US); Stephen A. O. Olson, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 18/287,382

(22) PCT Filed: Apr. 14, 2022

(86) PCT No.: PCT/IB2022/053548
§ 371 (c)(1),
(2) Date: Oct. 18, 2023

(87) PCT Pub. No.: WO2022/224106
PCT Pub. Date: Oct. 27, 2022

(65) Prior Publication Data
US 2024/0201509 A1      Jun. 20, 2024

Related U.S. Application Data

(60) Provisional application No. 63/176,972, filed on Apr. 20, 2021.

(51) Int. Cl.
| G02B 27/30 | (2006.01) |
| G02B 1/04 | (2006.01) |
| G02B 5/00 | (2006.01) |

(52) U.S. Cl.
CPC ............... *G02B 27/30* (2013.01); *G02B 1/04* (2013.01); *G02B 5/003* (2013.01)

(58) Field of Classification Search
CPC ............. G02B 27/30; G02B 1/04; G02B 5/00
See application file for complete search history.

(56) References Cited

U.S. PATENT DOCUMENTS

| 7,727,931 B2 | 6/2010 | Brey et al. | |
| 2003/0016368 A1 | 1/2003 | Aman et al. | |
| 2005/0128579 A1* | 6/2005 | Thomas ............... | G03B 21/625 |
| | | | 359/443 |
| 2016/0216420 A1 | 7/2016 | Gaides et al. | |
| 2020/0064647 A1 | 2/2020 | Saneto et al. | |
| 2020/0264349 A1 | 8/2020 | Chen-Ho et al. | |

OTHER PUBLICATIONS

International Search Report for PCT International Application No. PCT/IB22/53548, mailed on Jul. 12, 2022, 3 pages.

* cited by examiner

*Primary Examiner* — James A Dudek
(74) *Attorney, Agent, or Firm* — Jonathan L. Tolstedt

(57) ABSTRACT

A light control film includes a microstructured layer including a plurality of microstructures defining a plurality of grooves therebetween. The light control film further includes a light absorbing material disposed in each of the plurality of grooves. The light absorbing material includes a plurality of first particles. Each first particle includes a polymeric bead including an outer surface. Each first particle further includes an outer layer disposed on the outer surface of the polymeric bead. The outer layer of the first particle includes a metal compound.

16 Claims, 20 Drawing Sheets

LIGHT CONTROL FILM

CROSS REFERENCE TO RELATED APPLICATIONS

This application is a national stage filing under 35 U.S.C. 371 of PCT/IB2022/053548, filed Apr. 14, 2022, which claims the benefit of U.S. Provisional Application No. 63/176,972, filed Apr. 20, 2021, the disclosures of which are incorporated by reference in their entireties herein.

TECHNICAL FIELD

The present disclosure relates generally to a light control film and a method of manufacturing the light control film.

BACKGROUND

A light control film (LCF), also known as a light colli-mating film, is an optical film that is configured to regulate transmission of light, often to obscure what is being viewed from others (for example, privacy films). The LCF typically includes a light transmissive film having a plurality of parallel grooves. The grooves are generally filled with a light-absorbing material.

The LCF may be placed proximate a display surface, an image surface, or other surfaces to be viewed. At normal incidence (i.e., 0 degree viewing angle), where a viewer is looking at an image through the LCF in a direction perpendicular to the display surface, the image is viewable. Typically, the image can be viewed through the LCF only when the viewer is positioned within a range of angles referred to as "viewing angle". As the viewer moves outside a range of the viewing angle, the amount of light transmitted through the LCF decreases until a viewing cutoff angle is reached where substantially all the light is blocked by the light-absorbing material and the image is no longer viewable. Therefore, the LCFs control angular light emissions from the display surfaces and provide privacy to the viewer by blocking observation by others that are outside the range of the viewing angles.

SUMMARY

Generally, the present disclosure relates to a light control film. The present disclosure further relates to a method of manufacturing the light control film.

In a first aspect, the present disclosure provides a light control film. The light control film includes a microstruc-tured layer including a plurality of microstructures. The plurality of microstructures defines a plurality of grooves therebetween. The light control film further includes a light absorbing material disposed in each of the plurality of grooves. The light absorbing material includes a plurality of first particles. Each first particle includes a polymeric bead including an outer surface. Each first particle further includes an outer layer disposed on the outer surface of the polymeric bead. The outer layer includes a metal compound.

In a second aspect, the present disclosure provides a method of manufacturing a light control film. The method includes providing a plurality of polymeric beads. Each polymeric bead includes an outer surface. The method further includes forming a plurality of first particles by vapor depositing a metal on the outer surfaces of the plurality of polymeric beads. Each first particle includes an outer layer of a metal compound disposed on the outer surface of the corresponding polymeric bead. The method further includes forming a light absorbing material by mixing the plurality of first particles with a binder.

BRIEF DESCRIPTION OF THE DRAWINGS

Exemplary embodiments disclosed herein may be more completely understood in consideration of the following detailed description in connection with the following fig-ures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
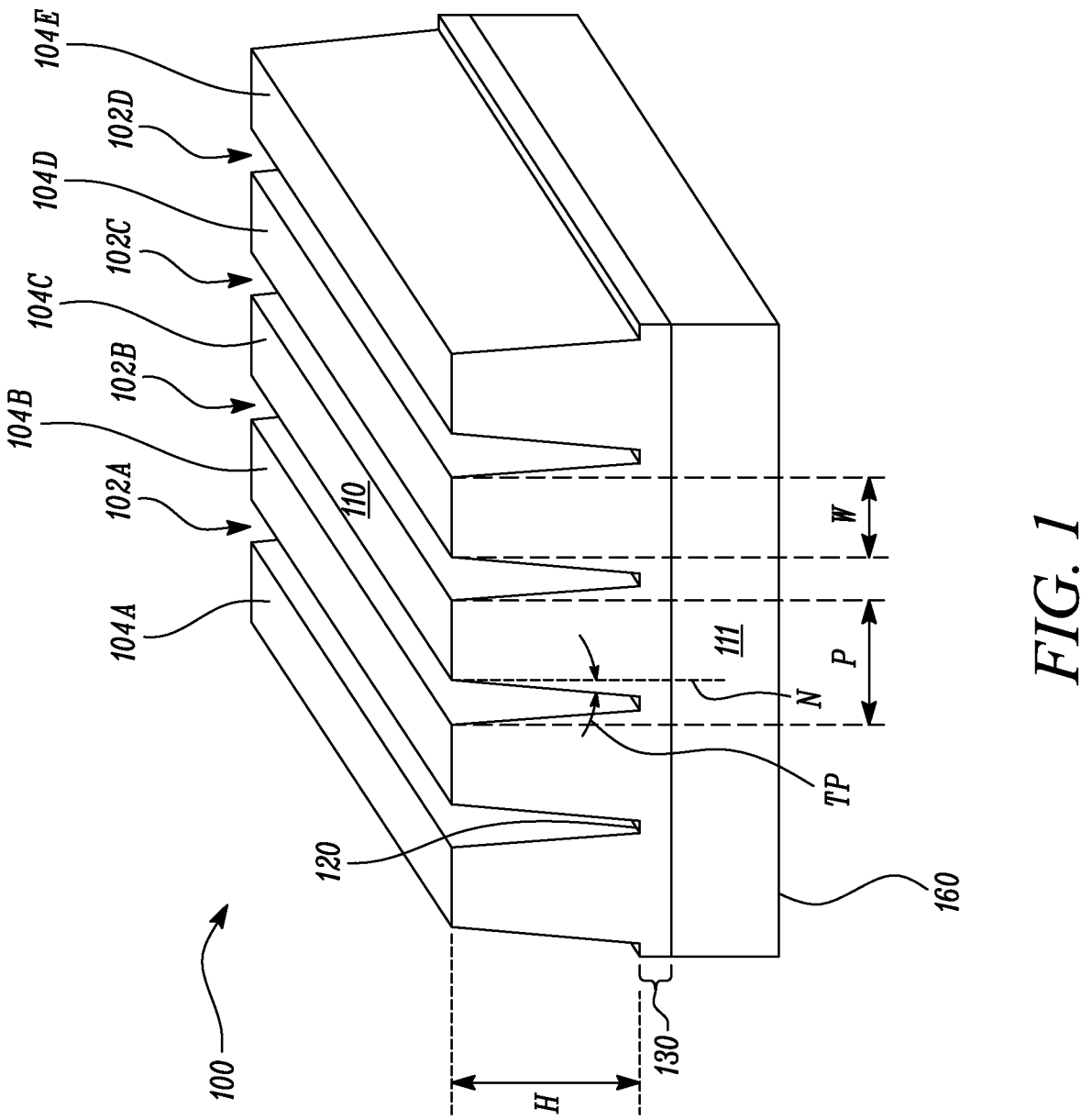
FIG. 1 shows a schematic perspective view of a micro-structured layer according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a light control film (LCF). The present disclosure further relates to a method of manufacturing such LCFs.

The LCF may be used in various optical applications, such as imaging applications, displays, and so forth. The LCF of the present disclosure may be placed between a viewer and an image plane of a display to limit the viewing angle of an image. The image plane may be included, for example, in a Liquid Crystal Display (LCD), a graphics display, and an indicia display. The LCF controls angular light emissions from emission surfaces, such as a display surface, an image surface, or other surfaces to be viewed, and provides privacy to the viewer by blocking observation by others that are outside a range of a viewing angle. The LCF may also be used to prevent or reduce unwanted light reflections from automotive windows. The LCF may also be used to prevent light from being directed towards reflective or potentially glare-producing surfaces, for example, a nearby windshield positioned at an angle with respect to a display in a vehicle.

The LCF of the present disclosure includes a microstructured layer including a plurality of microstructures. The plurality of microstructures defines a plurality of grooves therebetween. The LCF further includes a light absorbing material disposed in each of the plurality of grooves. The light absorbing material includes a plurality of first particles. Each first particle includes a polymeric bead including an outer surface. Each first particle further includes an outer layer disposed on the outer surface of the polymeric bead. The outer layer includes a metal compound.

The light absorbing material disposed in the plurality of grooves may have an improved shelf life. This may further improve a shelf life of the LCF. Further, the light absorbing material may further have an improved coating performance. Therefore, the LCF including the light absorbing material may result in a better quality LCF.

Further, using the light absorbing material of the present disclosure may substantially reduce the amount of a residue of the light absorbing material on a structured surface of the LCF. Presence of the residue of a light absorbing material on a structured surface of an LCF may degrade a viewing quality of the image. Specifically, the presence of the residue of the light absorbing material on the structured surface of the LCF may reduce a viewing clarity of the image. Therefore, the LCF of the present disclosure having less residue of the light absorbing material on the structured surface may have a better viewing clarity of an image.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, the term "viewing angle" is defined with respect to a normal to a plane of the LCF as the range of angles over which the LCF is substantially transmissive. In some cases, the viewing angle is centered with respect to the normal to the plane of the LCF. In some other cases, the viewing angle may not be centered at the normal to the plane of the LCF and may instead be off-center with respect to the normal. For example, the viewing angle of the LCF may be defined as a range of angles over which the transmission of the LCF is within 60%, within 50%, within 40%, within 20%, within 10%, or within 5% of a peak transmission.

As used herein, the term "metal compound" refers to a compound that includes one or more metal elements bonded to another element.

As used herein, when a first material is termed as "similar" to a second material, at least 90 weight % of the first and second materials are identical and any variation between the first and second materials includes less than about 10 weight % of each of the first and second materials.

Referring now to the Figures, FIG. 1 shows a microstructured layer 100 including a plurality of microstructures 104A-104E (collectively, the plurality of microstructures 104) in accordance with an embodiment of the present disclosure. The plurality of microstructures 104 defines a plurality of grooves 102A-102D (collectively, the plurality of grooves 102) therebetween. Specifically, the groove 102A is defined by the adjacent microstructures 104A, 104B. The groove 102B is defined by the adjacent microstructures 104B, 104C. The groove 102C is defined by the adjacent microstructures 104C, 104D. The groove 102D is defined by the adjacent microstructures 104D, 104E. In some embodiments, the plurality of grooves 102 includes at least one of a square shape, a rectangular shape, a curved shape, a trapezoidal shape, and a polygonal shape. However, the plurality of first grooves 306A may have any suitable shape, geometry, and dimensions, as per desired application attributes.

The microstructured layer 100 further includes a base layer 111. The base layer 111 may be integrally formed with, or separately added to the microstructured layer 100 (whether by extrusion, cast-and-cure, or some other method).

In some embodiments, the base layer 111 may include, for example, polyethylene terephthalate, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene and polycyclo-olefins, polyimides, and glass. Optionally, the base layer 111 may include mixtures or combinations of these materials.

In some embodiments, the plurality of microstructures 104 may be formed on the base layer 111 by various methods, such as extrusion, cast-and-cure, coating, or some other method. In some cases, the plurality of microstructures 104 may be micro-replicated on the base layer 111. A typical micro-replication process includes depositing a polymerizable composition onto a master negative microstructured molding surface in an amount barely sufficient to fill the cavities of the master. The master can be metallic, such as nickel, chrome- or nickel-plated copper or brass, or can be a thermoplastic material that is stable under the polymerization conditions and has a surface energy that allows clean removal of the polymerizable composition from the master. The cavities are then filled by moving a bead of the polymerizable composition between a preformed base or substrate layer (for example, the base layer 111) and the master. The composition is then cured.

In some embodiments, the plurality of microstructures 104 may have a transmittance of, for example, greater than about 70%, greater than about 80%, or greater than about 90% in the visible light spectrum. In some embodiments, the plurality of microstructures 104 may be made of a polymerizable resin. In some cases, the polymerizable resin may be optically clear having a substantially high transmission in a wavelength range from about 300 nanometers (nm) to about 800 nm. The polymerizable resin may include a combination of a first polymerizable component and a second polymerizable component selected from (meth)acrylate monomers. (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition may include a (meth)acrylated urethane oligomer, (meth) acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin.

In some embodiments, the plurality of microstructures 104 are joined to the base layer 111. In some embodiments, a land 130 may be present between a base 120 of the plurality of grooves 102 and the base layer 111. In some embodiments, the land 130 may be formed during the micro-replication process. The land 130 may be a continuous land or a discontinuous land. In some embodiments, the land 130 has a thickness less than about 20 microns (μm), or less than about 10 μm.

In some embodiments, the plurality of microstructures 104 further defines a structured surface 110. In some embodiments, the base layer 111 further defines a non-structured surface 160 opposite to the structured surface 110. In some embodiments, the non-structured surface 160 may be substantially planar.

Each of the plurality of microstructures 104 has a height H excluding the land 130 and a minimum width W at narrowest portion. The plurality of microstructures 104 are disposed spaced apart from each other by a pitch P.

In some embodiments, the height H of the plurality of microstructures 104 may be in a range from about 50 μm to about 200 μm. In some embodiments, the height H may be greater than about 75 μm, greater than about 100 μm, greater than about 120 μm, greater than about 150 μm, or greater than about 250 μm. In some embodiments, the minimum width W of the plurality of microstructures 104 may be in a range from about 2 μm to about 50 μm. In some embodiments, the minimum width W may be greater than about 1 μm, greater than about 5 μm, greater than about 10 μm, greater than about 25 μm, or greater than about 75 μm. In some embodiments, the pitch P may be greater than about 5 μm, greater than about 10 μm, greater than about 25 μm, greater than about 75 μm, greater than about 100 μm, or greater than about 125 μm.

In the illustrated embodiment, each microstructure 104 is tapered from the base 120. Further, each microstructure 104 defines a taper angle TP with respect to a normal N to the base 120. As used herein, a "normal" to a surface refers to a perpendicular to the major plane of the surface, discounting any local variation in surface smoothness. In some embodiments, the taper angle TP is less than about 5 degrees, less than about 10 degrees, less than about 15 degrees, less than about 20 degrees, less than about 30 degrees, or less than about 45 degrees. Due to the taper angle TP, each microstructure 104 has the minimum width W at the structured surface 110 and a maximum width (not shown) at the base 120. However, in some other embodiments, the microstructures 104 may not have any taper (i.e., the taper angle TP=0 degree) and each microstructure 104 has a substantially uniform width along the height H. In such cases, the minimum width W is equal to the uniform width of each microstructure 104.

Figure 2:
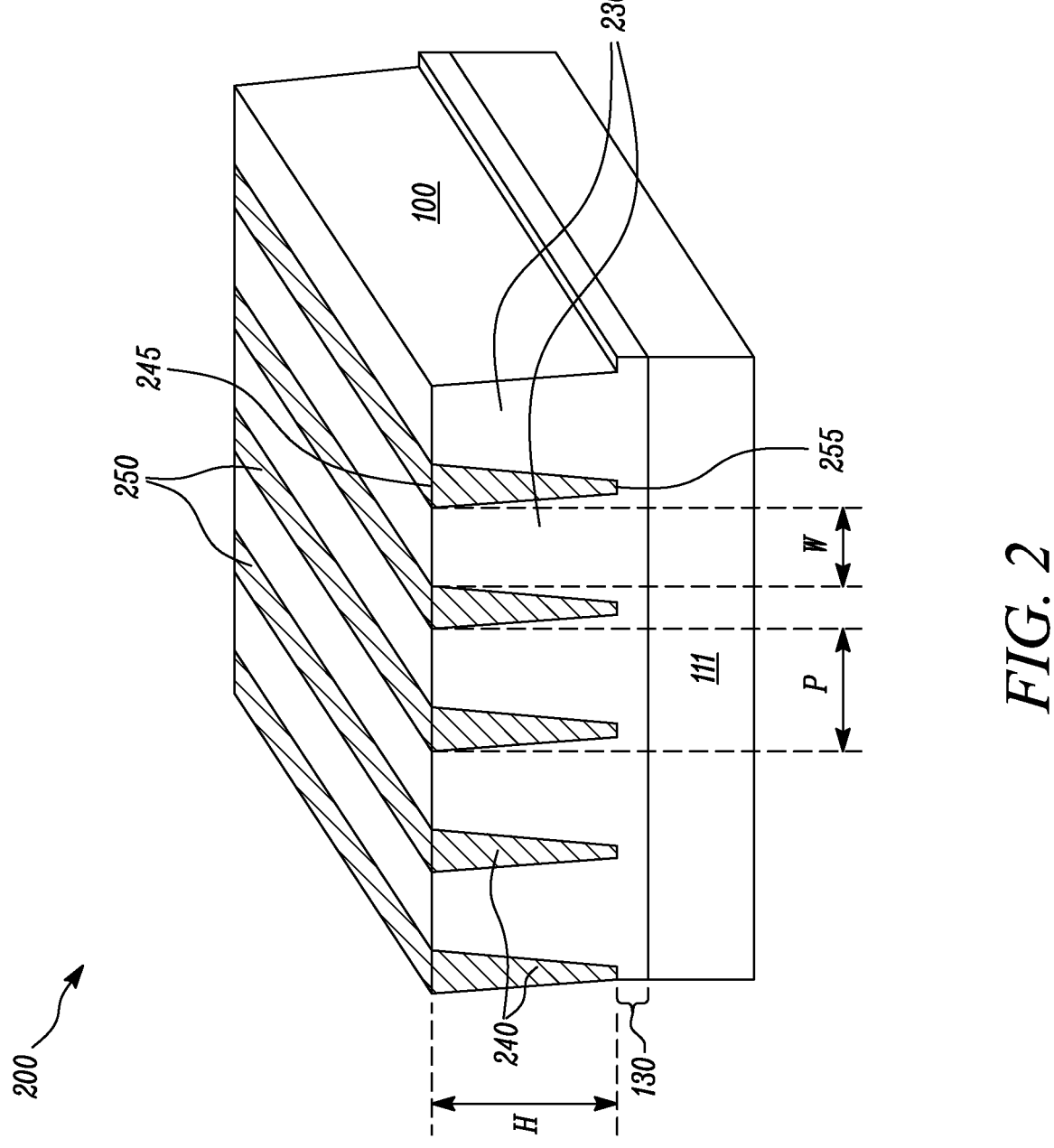
FIG. 2 shows a schematic perspective view of a light control film (LCF) according to an embodiment of the present disclosure.

FIG. 2 shows a light control film (LCF) 200 according to an embodiment of the present disclosure. The LCF 200 includes the microstructured layer 100. In some embodiments, the plurality of microstructures 104 (shown in FIG.

1) forms a plurality of light transmissive regions 230. Therefore, the plurality of light transmissive regions 230 has the height H excluding the land 130 and the minimum width W at narrowest portion. The plurality of light transmissive regions 230 are disposed spaced apart from each other by the pitch P.

The LCF 200 further includes a light absorbing material 250 disposed in each of the plurality of grooves 102 (shown in FIG. 1). The plurality of grooves 102 is rendered light-absorbing by at least partially filling them with the light absorbing material 250. Therefore, in some embodiments, the plurality of grooves 102 at least partially filled with the light absorbing material 250 forms a plurality of light absorbing regions 240. The term "light absorbing regions", as used in the present disclosure, refers to regions in the microstructured layer 100 of the LCF 200 that are intended to substantially block the transmission of light within a desired spectral range. The light absorbing material 250 may absorb light or scatter (or disperse) light. Each of the plurality of light absorbing regions 240 has a base surface 245 and a top surface 255 opposite to the base surface 245. In some embodiments, a ratio of a length of the top surface 255 to a length of the base surface 245 is less than about 0.65, less than about 0.60, or less than about 0.55.

Figure 3:
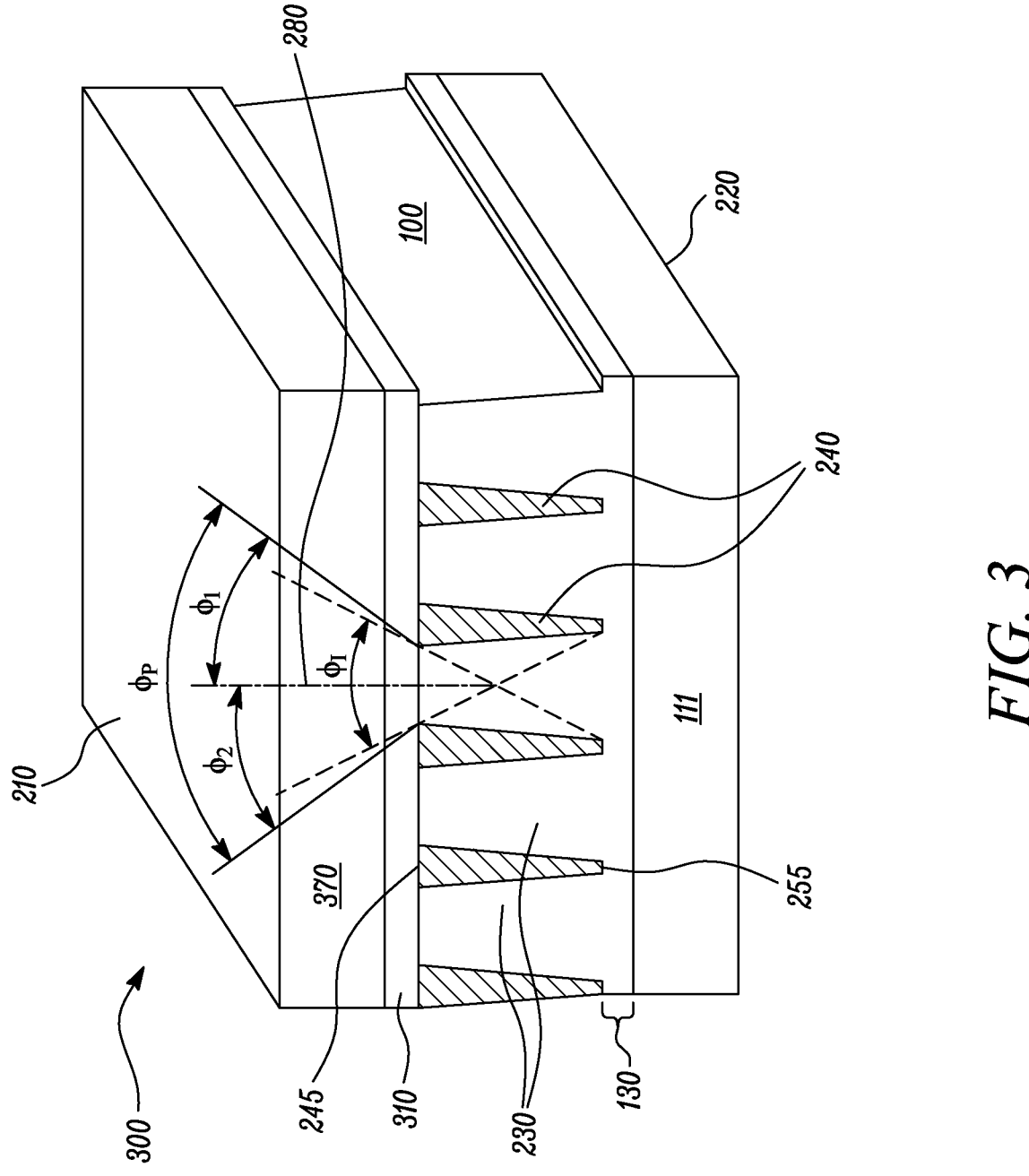
FIG. 3 shows a schematic perspective view of an LCF according to another embodiment of the present disclosure.

FIG. 3 shows another LCF 300 according to an embodiment of the present disclosure. The LCF 300 is substantially similar to the LCF 200 shown in FIG. 2. However, the LCF 300 further includes an optional cover film 370. The optional cover film 370 may include same material as, or different from, the base layer 111. In some embodiments, the optional cover film 370 may include polycarbonate films. The polycarbonate films may provide a matte finish or a glossy finish. The optional cover film 370 and the base layer 111 may either or both have a matte finish or a glossy finish. In some embodiments, the optional cover film 370 may be bonded to the structured surface 110 with an adhesive layer 310. The adhesive layer 310 may include any optically clear adhesive, such as a UV-curable acrylate adhesive, a transfer adhesive, and the like. In some embodiments, the LCF 300 includes a light input surface 210 and a light output surface 220 opposite to the light input surface 210. In some embodiments, the plurality of light transmissive regions 230 and the plurality of light absorbing regions 240 are disposed between the light input surface 210 and the light output surface 220. In some embodiments, the LCF 300 may have either the light output surface 220 facing a viewer, or a display source and the light input surface 210 may either be facing the display source or the viewer.

In some embodiments, the LCF 300 is positioned such that the light input surface 210 is disposed proximal to the base surface 245 of each of the plurality of light absorbing regions 240, however, in some embodiments, the light input surface 210 may be disposed opposite to the base surface 245, and proximal to the top surface 255. In other words, the LCF 300 can be positioned such that the base surface 245 is closer to a light source (not shown), or it can also be positioned such that the top surface 255 is closer to a light source (not shown).

The LCF 300 includes an internal viewing cutoff angle $\Phi_I$ defined by the geometry of each of the plurality of light transmissive regions 230 and each of the plurality of light absorbing regions 240. A polar viewing cutoff angle $\Phi_P$ can be determined by applying Snell's law to the rays defining the internal viewing cutoff angle $\psi_I$, using the indices of refraction of the optional cover film 370, the adhesive layer 310, the plurality of light transmissive regions 230, the base layer 111, and the material that the LCF 300 is immersed in (typically air). The polar viewing cutoff angle $\Phi_P$ can range from 0 degree (i.e., normal to the light input surface 210) to 90 degrees (i.e., parallel to light input surface 210). In some embodiments, the polar viewing cutoff angle $\Phi_P$ is equal to the sum of a polar viewing cutoff half angle $\Phi_1$ and a polar viewing cutoff half angle $\Phi_2$. The polar viewing cutoff half angle $\Phi_1$ and the polar viewing cutoff half angle $\Phi_2$ are measured from a normal 280 to the light input surface 210.

Figure 4:
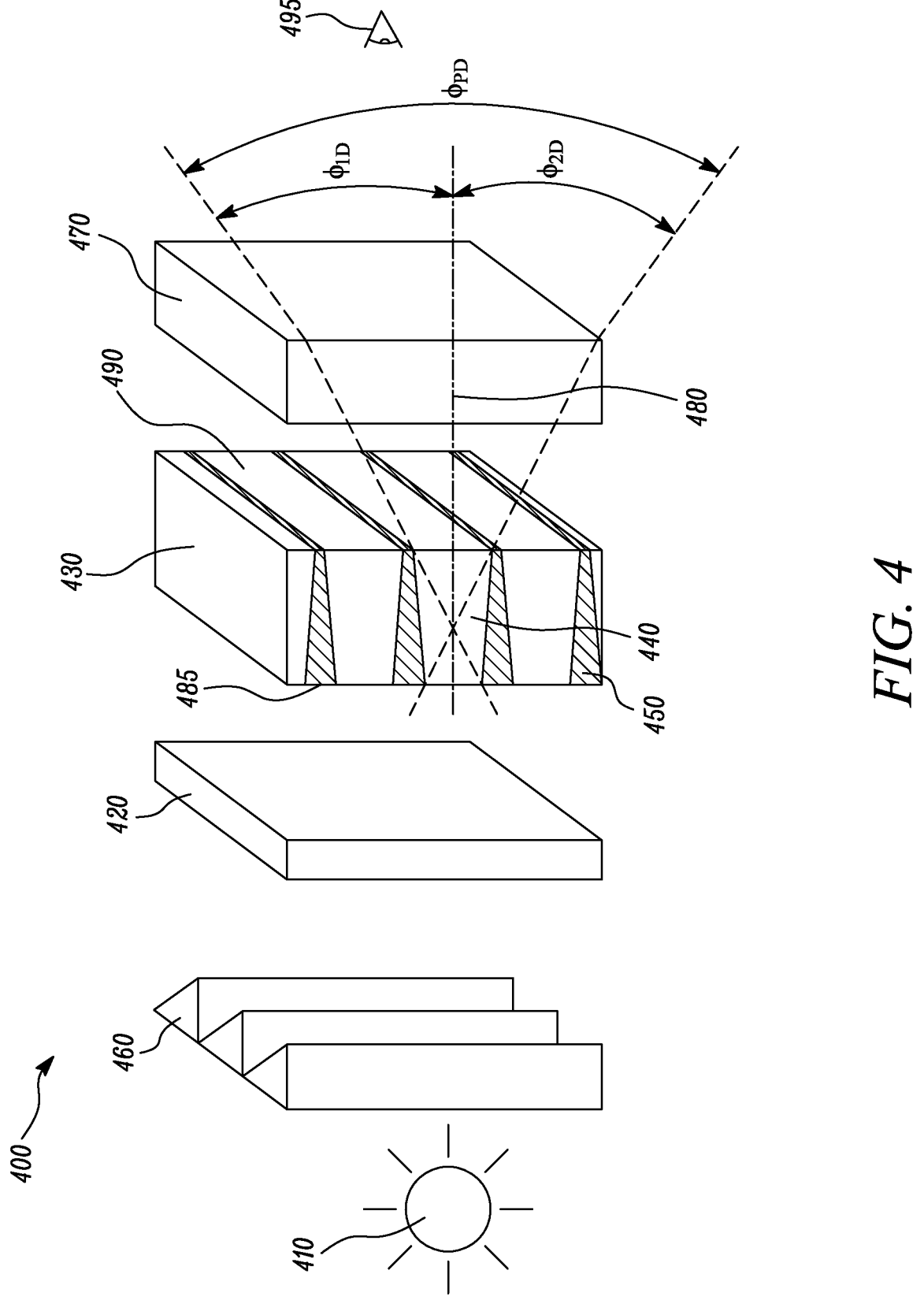
FIG. 4 shows an exploded view of a backlit display according to an embodiment of the present disclosure.

FIG. 4 shows an exploded view of a backlit display 400 according to an embodiment of the present disclosure. The backlit display 400 includes an LCF 430, a light source 410, and an image plane 420. In some embodiments, the image plane 420 may include an LCD panel. In the illustrated embodiment of FIG. 4, the backlit display 400 further includes an optional prismatic film 460. In some embodiments, the LCF 430 is substantially similar to the LCF 200 shown in FIG. 2. In some other embodiments, the LCF 430 may be substantially similar to the LCF 300 shown in FIG. 3. The LCF 430 includes a plurality of light transmissive regions 440 and a plurality of light absorbing regions 450.

The backlit display 400 defines a polar viewing cutoff angle $\Phi_{PD}$ of a light exiting a light output surface 490 of the LCF 430. The polar viewing cutoff angle $\Phi_{PD}$ includes a polar viewing cutoff half angle $\Phi_{1D}$ and a polar viewing cutoff half angle $\Phi_{2D}$ measured from a normal 480 to a light input surface 485. In some embodiments, the polar viewing cutoff angle $\Phi_{PD}$ is equal to a sum of the polar viewing cutoff half angle $\Phi_{1D}$ and the polar viewing cutoff half angle $\Phi_{2D}$. In some cases, the polar viewing cutoff angle $\Phi_{PD}$ can be symmetric, i.e., the polar viewing cutoff half angle $\Phi_{1D}$ is equal to the polar viewing cutoff half angle $\Phi_{2D}$. In some other cases, the polar viewing cutoff angle $\Phi_{PD}$ can be asymmetric, i.e., the polar viewing cutoff half angle $\Phi_{1D}$ is not equal to the polar viewing cutoff half angle $\Phi_{2D}$.

The light source 410 is configured to transmit light through the optional prismatic film 460, then through the image plane 420, and finally through the LCF 430, and further to a viewer 495. In some embodiments, the backlit display 400 may further include optional cover layer 470. The optional cover layer 470 may provide, for instance, an anti-glare coating, an anti-reflective coating, an anti-soiling coating, or some combination thereof. A viewing angle at which the brightness is a maximum may depend on whether the polar viewing cutoff angle $\Phi_{PD}$ is symmetric about the normal 480 or is asymmetric. In some embodiments, the brightness of the backlit display 400 may be greatest along the normal 480 (referred to as the "axial brightness") and decrease as the viewing angle is increased. For asymmetric polar viewing cutoff angles (not shown), the maximum brightness may not be coincident with the normal 480.

FIGS. 5A, 5B, 5C and 5D show partial enlarged views of the light absorbing region 240 including the light absorbing material 250, according to different embodiments of the present disclosure.

Figure 5A:
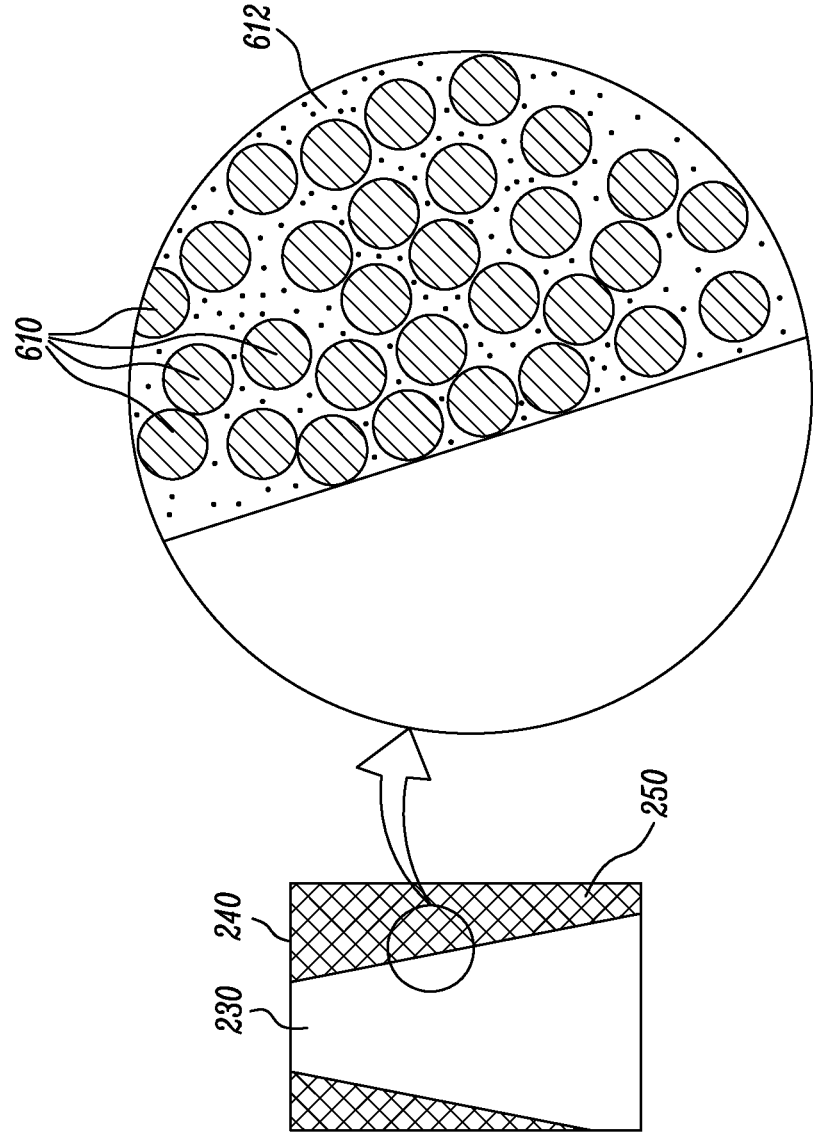
FIGS. 5A-5D show close-up views of a light absorbing region according to different embodiments of the present disclosure.

Referring to FIG. 5A, the light absorbing material 250 includes a plurality of first particles 610. In some embodiments, the plurality of first particles 610 may dispersed in a suitable binder 612 to form the light absorbing material 250.

Figure 5B:
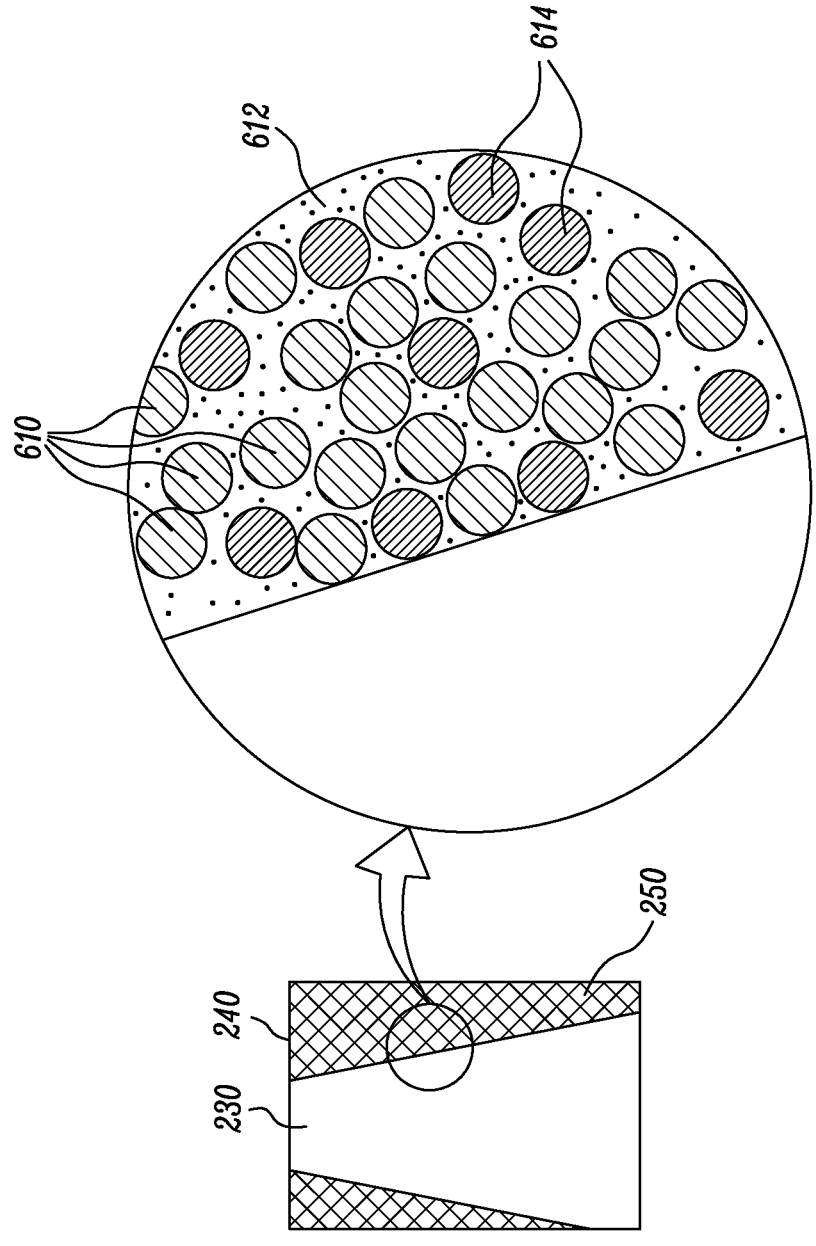

Referring to FIG. 5B, in some embodiments, the light absorbing material 250 further includes a plurality of second particles 614. In some embodiments, the plurality of first particles 610 and the plurality of second particles 614 may dispersed in the binder 612 to form the light absorbing material 250. In some embodiments, a weight ratio of the plurality of first particles 610 to the plurality of second particles 614 is from about 10 to about 50. In some embodiments, a weight ratio of the plurality of first particles 610 to the plurality of second particles 614 is greater than about 55, greater than about 60, greater than about 65, or greater than about 70.

Figure 5C:
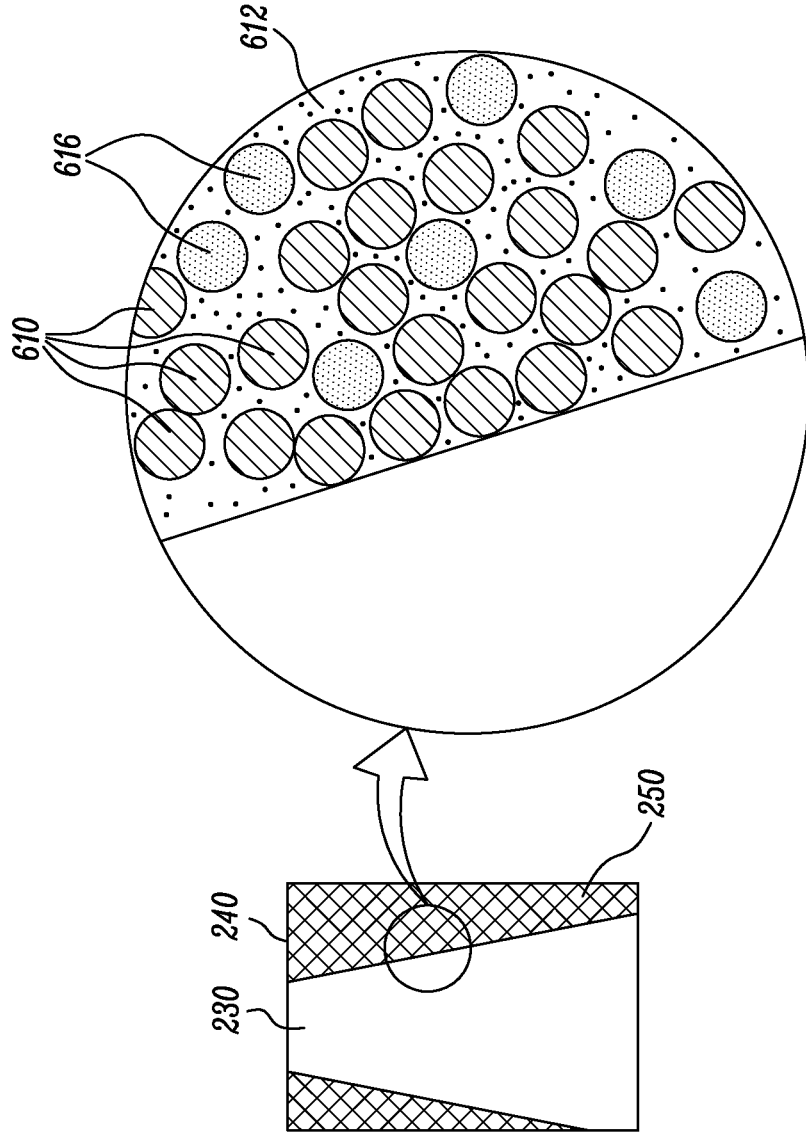

Referring to FIG. 5C, in some embodiments, the light absorbing material 250 further includes a plurality of third particles 616. In some embodiments, the plurality of first particles 610 and the plurality of third particles 616 may dispersed in the binder 612 to form the light absorbing material 250. In some embodiments, a weight ratio of the plurality of first particles 610 to the plurality of third particles 616 is from about 10 to about 200. In some embodiments, a weight ratio of the plurality of first particles 610 to the plurality of third particles 616 is greater than about 210, greater than about 215, greater than about 220, or greater than about 225.

Figure 5D:
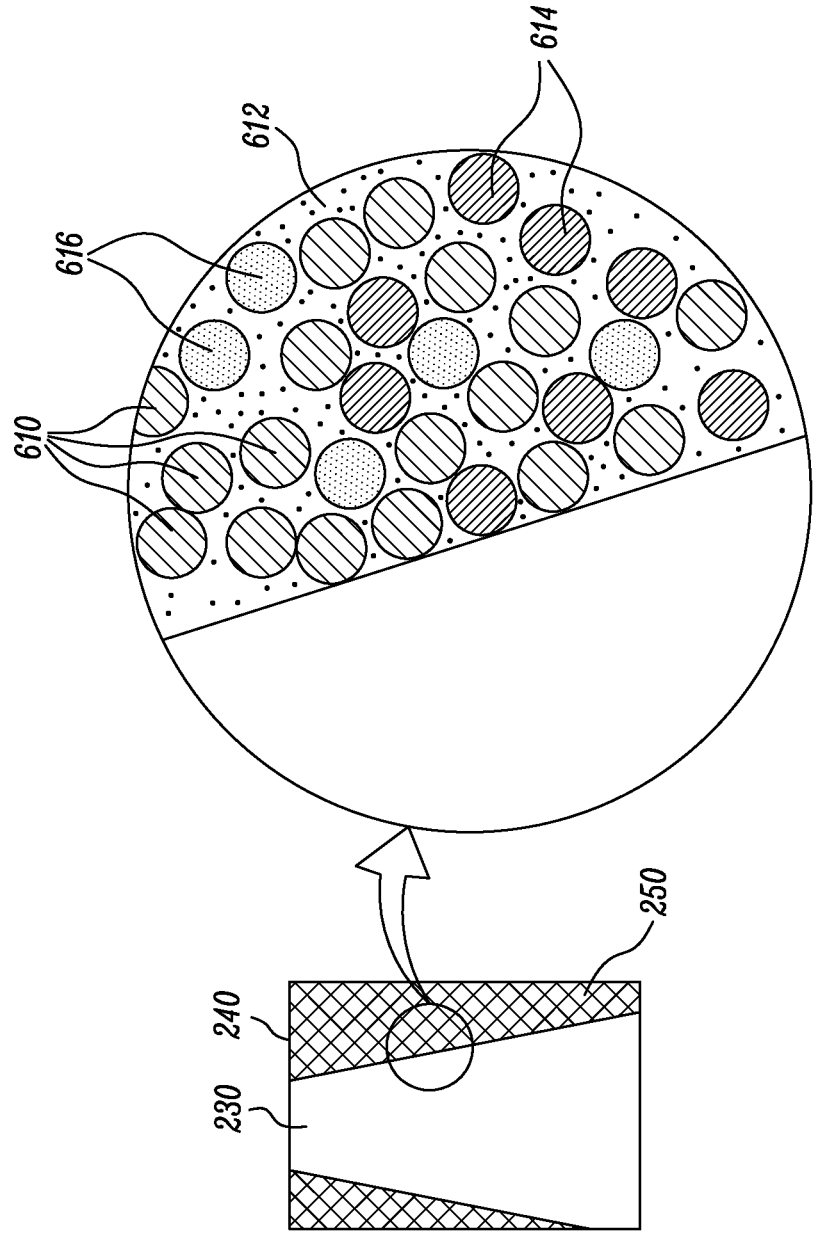

Referring to FIG. 5D, in some embodiments, the light absorbing material 250 includes the plurality of first particles 610, the plurality of second particles 614, and the plurality of third particles 616. In some embodiments, the plurality of first particles 610, the plurality of second particles 614, and the plurality of third particles 616 may dispersed in the binder 612 to form the light absorbing material 250.

In some embodiments, the light absorbing material 250 may further include particles or other scattering elements that can function to block light from being transmitted through the plurality of light absorbing regions 240.

Figure 6:
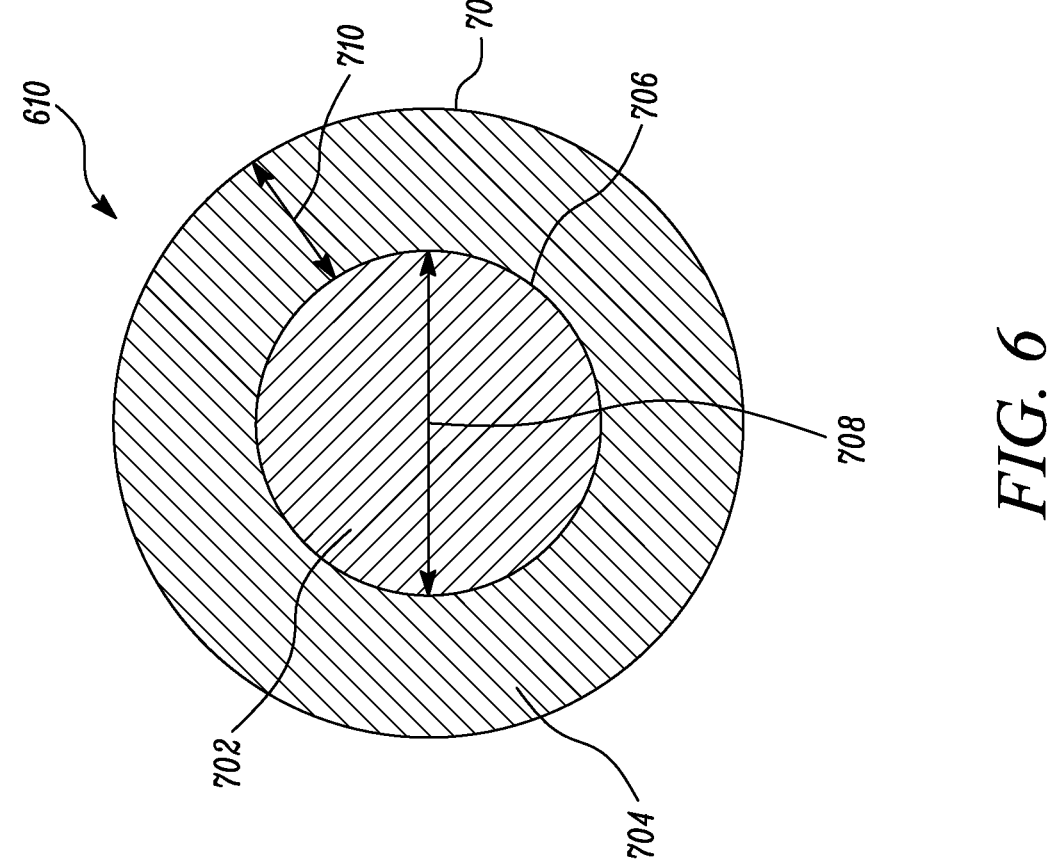
FIG. 6 shows a schematic cross-sectional view of a first particle according to an embodiment of the present disclo-sure.

FIG. 6 illustrates a schematic cross-sectional view of the first particle 610 from the plurality of first particles 610. Each first particle 610 from the plurality of first particles 610 includes a polymeric bead 702. In some embodiments, the polymeric bead 702 includes a cross-linked polymer. In some embodiments, the cross-linked polymer includes polystyrene. In some other embodiments, the cross-linked polymer includes polymethyl methacrylate (PMMA). In the illustrated embodiment of FIG. 6, the polymeric bead 702 has a substantially spherical shape. However, in some other embodiments, each polymeric bead 702 may have any suitable shape based on desired application attributes, for example, polyhedral, spheroidal, and so forth. In some embodiments, an average diameter 708 of each polymeric bead 702 is from about 1 μm to about 5 μm. In some embodiments, the average diameter 708 of each polymeric bead 702 is greater than about 6 μm, greater than about 8 μm, or greater than about 10 μm. The polymeric bead 702 includes an outer surface 706.

Each first particle 610 further includes an outer layer 704 disposed on the outer surface 706 of the polymeric bead 702. The outer layer 704 includes a metal compound. In some embodiments, the metal compound includes at least one of an aluminum oxide, a copper oxide, and a stainless steel. In other words, the metal compound includes an aluminum oxide, a copper oxide, and/or a stainless steel. In some embodiments, the metal compound includes an aluminum nitride. In some embodiments, the outer layer 704 of the polymeric bead 702 is formed by vapor depositing a metal on the outer surface 706 of the polymeric bead 702 to form the metal compound. The first particle further defines an average thickness 710 of the outer layer 704. The outer layer 704 encloses the polymeric bead 702 and defines an outer surface 709 of the first particle 610. The average thickness 710 extends from the outer surface 706 of the polymeric bead 702 to the outer surface 709 of the first particle 610. In some embodiments, the average thickness 710 of the outer layer 704 is from about 1 nm to about 15 nm. In some embodiments, the average thickness 710 of the outer layer 704 is from about 2 nm to about 10 nm.

Figure 7:
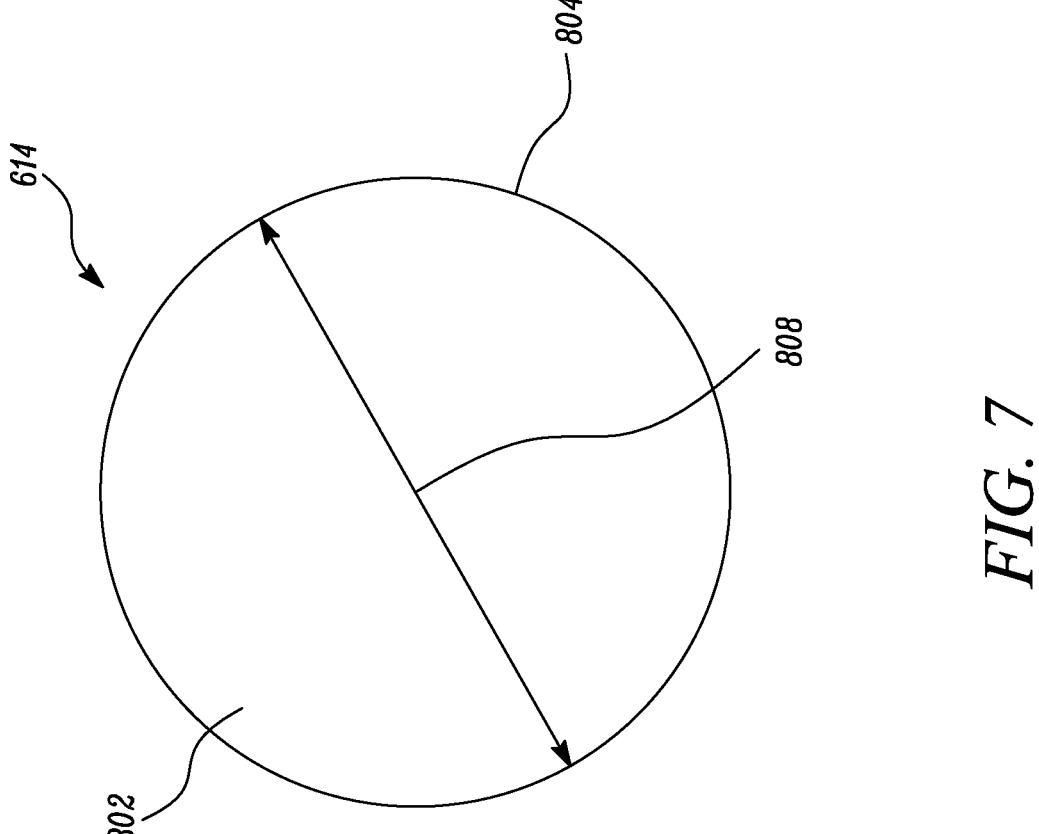
FIG. 7 shows a schematic view of a second particle according to an embodiment of the present disclosure.

FIG. 7 illustrates a schematic view of the second particle 614. Each second particle 614 from the plurality of second particles 614 includes an uncoated polymeric bead 802. In some embodiments, the uncoated polymeric bead 802 may be similar to the polymeric bead 702. In some embodiments, the uncoated polymeric bead 802 may be different from the polymeric bead 702. In some embodiments, the uncoated polymeric bead 802 includes a cross-linked polymer. In some embodiments, the cross-linked polymer includes poly-styrene. In some other embodiments, the cross-linked poly-mer includes polymethyl methacrylate (PMMA). In some embodiments, an average diameter 808 of each uncoated polymeric bead 802 is from about 1 μm to about 5 μm. The uncoated polymeric bead 802 further includes an outer surface 804. In some embodiments, the average diameter 808 of each uncoated polymeric bead 802 is greater than about 6 μm, greater than about 8 μm, or greater than about 10 μm.

Figure 8:
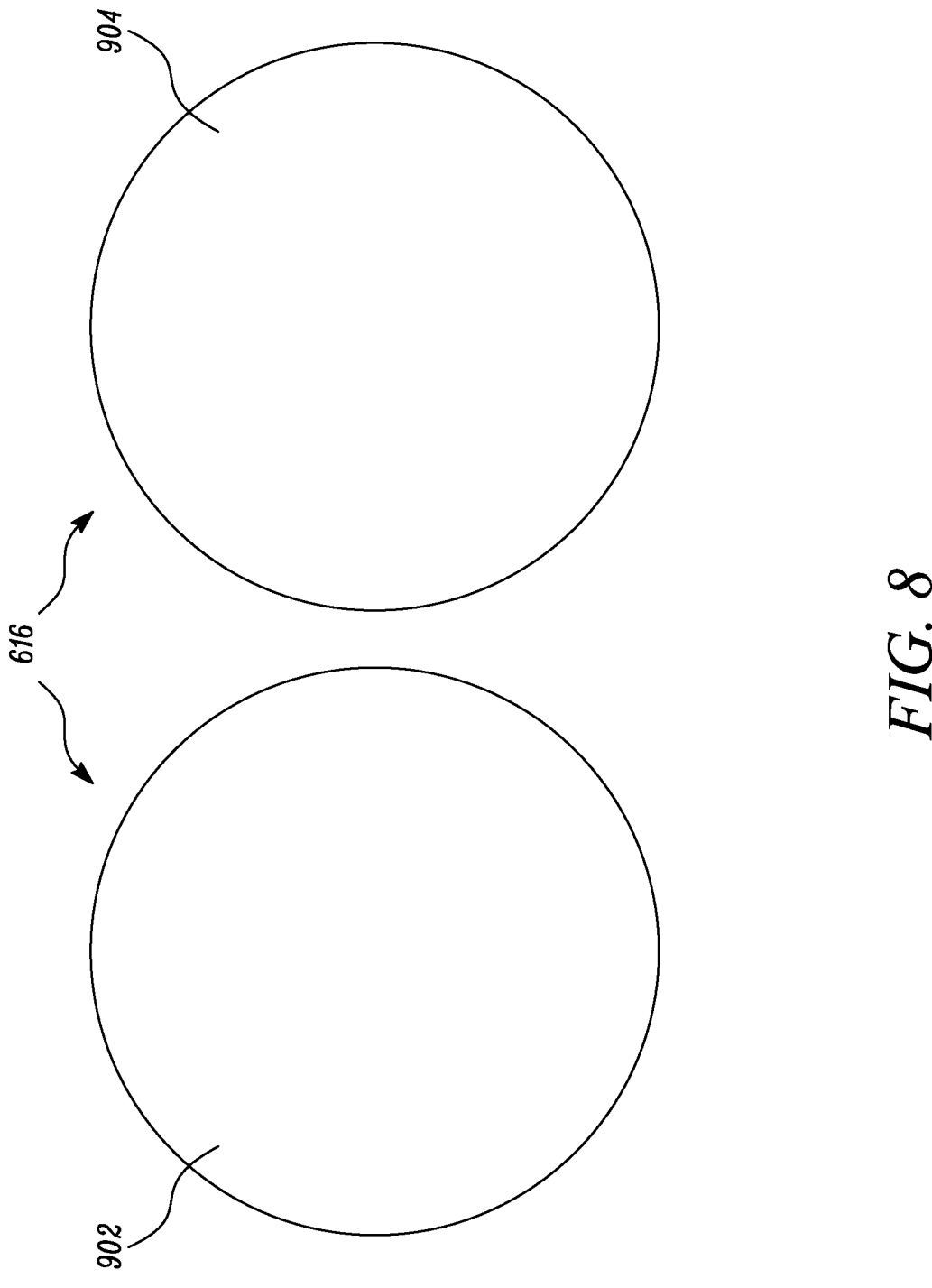
FIG. 8 shows a schematic view of a third particle accord-ing to an embodiment of the present disclosure.

FIG. 8 illustrates a schematic view of the third particle 616. In some embodiments, each third particle 616 includes at least one of a carbon black 902 and a visible light absorbing dye 904. In other words, the third particle 616 includes the carbon black 902 and/or the visible light absorbing dye 904. The carbon black 902 may be a particu-late carbon black having a mean particle size less than about 10 μm, less than about 8 μm, less than about 6 μm, less than about 4 μm, or less than about 2 μm. In some embodiments, the carbon black 902 may have a mean particle size of less than 1 μm. In some embodiments, the visible light absorbing dye 904 may include black dyes or other dark dyes. In some embodiments, the visible light absorbing dye 904 may include an aromatic diamino-based metal complex, an ali-phatic diamine-based metal complex, an aromatic dithiol-base metal complex, a mercaptophenol-based metal com-plex, a squarylium-based compound, a cyanine-based dye, a methine-based dye, a naphthoquinone-based dye, and an anthraquinone-based dye.

Figure 9:
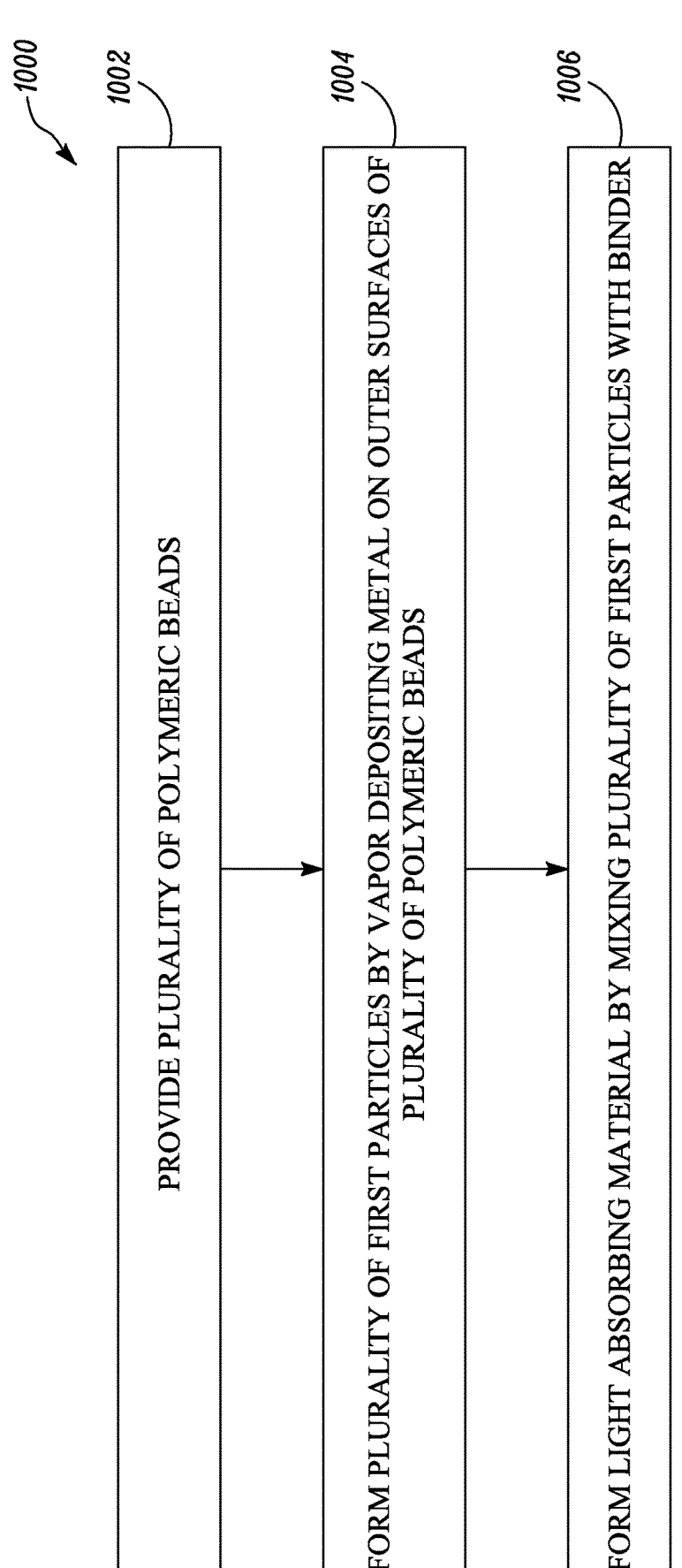
FIG. 9 shows a flowchart of a method of manufacturing an LCF according to an embodiment of the present disclo-sure.

FIG. 9 shows a flowchart of an exemplary method 1000 of manufacturing an LCF of the present disclosure. The LCF may be any one of the LCF 200, the LCF 300, the LCF 430 illustrated in FIGS. 2, 3, and 4, respectively. The method 1000 will be described with reference to the LCF 200 of FIG. 2 and FIGS. 10A-10D.

Figures 10A, 10B, 10C, 10D:
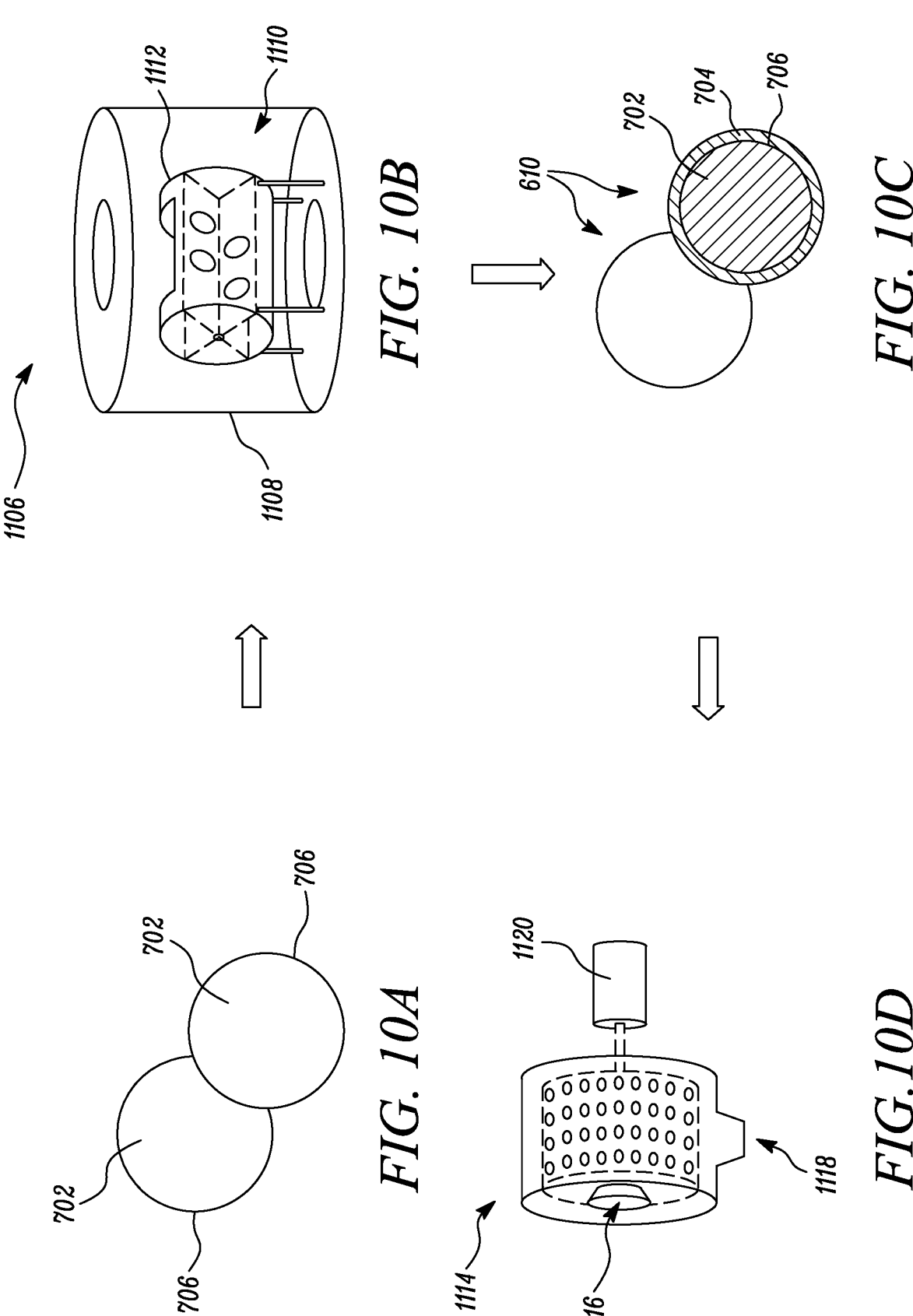
FIGS. 10A-10D show schematic views of various steps of manufacturing an LCF according to an embodiment of the present disclosure.

At step 1002, the method 1000 includes providing the plurality of polymeric beads 702 (shown in FIG. 10A). Each polymeric bead 702 includes the outer surface 706.

At step 1004, the method 1000 further includes forming the plurality of first particles 610 by vapor depositing a metal on the outer surfaces 706 of the plurality of polymeric beads 702 (shown in FIGS. 10B and 10C). Each first particle 610 includes the outer layer 704 of a metal compound disposed on the outer surface 706 of the corresponding polymeric bead 702. In some embodiments, the metal compound includes at least one of an aluminum oxide, an aluminum nitride, a copper oxide, and a stainless steel.

In some embodiments, vapor depositing the metal on the outer surface 706 of the plurality of polymeric 702 may include a method similar to that described in U.S. Pat. No. 7,727,931 (Brey et al.). In some embodiments, an apparatus 1106 (shown in FIG. 10B) may be used for vapor depositing the metal on the outer surface 706 of the plurality of polymeric beads 702. The apparatus 1106 includes a housing 1108 defining a vacuum chamber 1110. The vacuum cham-ber 1110 includes a particle agitator 1112. In some embodi-ments, the apparatus 1106 may include that described in U.S. Pat. No. 7,727,931 (Brey et al.).

At step 1006, the method 1000 further includes forming the light absorbing material 250 by mixing the plurality of first particles 610 with the binder 612 (shown in FIG. 5B). In some embodiments, a tumble mixer 1114 (shown in FIG. 10D) may be used to mix the plurality of first particles 610 with the binder 612.

The tumble mixer 1114 includes an input 1116 and an output 1118 (shown in FIG. 10D). The tumble mixer 1114 further includes a motor 1120. In some embodiments, the plurality of first particles 610 and the binder 612 may enter the tumble mixer 1114 from the input 1116. In some embodi-ments, the light absorbing material 250 (mixture of the plurality of first particles 610 and the binder 612) may exit the tumble mixer 1114 from the output 1118. In some embodiments, forming the light absorbing material 250 further includes mixing the plurality of second particles 614 with the binder 612 (shown in FIG. 5B). Each second particle 614 includes the uncoated polymeric bead 802 (shown in FIG. 7). In some embodiments, the weight ratio of the plurality of first particles 610 to the plurality of second particles 614 is from about 10 to about 50. In some embodi-ments, forming the light absorbing material 250 further includes mixing the plurality of third particles 616 with the binder 612. In some embodiments, each third particle 616 includes the carbon black 902. In some embodiments, each third particle 616 includes the visible light absorbing dye 904. In some embodiments, each third particle 616 includes at least one of the carbon black 902 and the visible light absorbing dye 904. In some embodiments, the weight ratio of the plurality of first particles 610 to the plurality of third particles 616 is from about 10 to about 200.

In some embodiments, the method 1000 further includes providing the microstructured layer 100 (shown in FIG. 1) including the plurality of microstructures 104 defining the plurality of grooves 102 therebetween. In some embodi-ments, the plurality of microstructures 104 forms the plu-rality of light transmissive regions 230. The method 1000 further includes filling the plurality of grooves 102 with the light absorbing material 250 to form the plurality of light absorbing regions 240.

Now referring to FIGS. 1, 2 5A-5D, and 10A-10D, the light absorbing material 250 disposed in the plurality of grooves 102 may have an improved shelf life. This may further improve a shelf life of the LCF 200. Further, the light absorbing material 250 may further have an improved coating performance. Therefore, the LCF 200 including the light absorbing material 250 may result in a better quality LCF.

Further, using the light absorbing material 250 may substantially reduce the amount of a residue of the light absorbing material 250 on the structured surface 110 of the LCF 200. Presence of a residue of a light absorbing material on a structured surface of an LCF may degrade a viewing quality of an image through the LCF. Specifically, the presence of the residue of the light absorbing material on the structured surface of the LCF may reduce a viewing clarity of the image. Therefore, the LCF 200 having less residue of the light absorbing material 250 on the structured surface 110 may have a better viewing clarity.

The disclosure is further described with reference to the following examples. The examples will be explained with reference to FIGS. 11 to 17A-17B.

The following examples are intended for illustrative pur-poses only, since numerous modifications and variations within the scope of the present disclosure will be apparent to those skilled in the art. Unless otherwise noted, all parts, percentages, and ratios reported in the following examples are on a weight basis.

DESCRIPTION OF EXAMPLES AND COMPARATIVE EXAMPLES

Examples 1-4 are representative of light absorbing particles the present disclosure. Examples 5-15 are representative of light absorbing material 250 of the present disclosure. Comparative Example 1 is representative of a light absorbing material whereby carbon black is the principal absorbing component. Examples 16-26 are exemplary light control films (LCFs). Comparative Example 2 is a light control film made using the carbon black as the light absorbing material.

Light Absorbing Particles

Metallization of Particles by Physical Vapor Deposition Method

The apparatus and coating method for metal coating of 300 milliliters (mL) volume size of cross-linked polystyrene beads were similar to those described in the U.S. Pat. No. 7,727,931 (Brey et al). For 2000 mL volume batches, the particles were coated using a hollow cylinder particle agitator (24.3 centimeter (cm) long×19.05 cm diameter horizontal) with a rectangular opening (16.51 cm×13.46 cm) in the top.

Example 1A

Chemisnow SX-130H, a cross-linked polystyrene bead, (commercially available from Soken Chemical and Engineering Co., Ltd, Japan) is reported to have a mean particle size of 1.3 μm (per supplier web site). Wacker HDKH18 fumed silica was mixed into to the SX-130H (1% concentration, by weight). The mixed SX-130H beads (670.82 gram (g)) were introduced into a vacuum chamber (commercially available from Sierra Applied Sciences) equipped with a 1-gallon particle agitator and a 5-inch by 12-inch by 0.5-inch 1100 Aluminum Alloy sputtering target and cathode. During deposition, the particle agitator was operated at about 4 revolutions per minute (rpm). The chamber was pumped down to a base pressure of about $2.3 \times 10^{-6}$ Torr. Aluminum was reactively sputtered at a pressure of about 10 millitorr (mTorr) using Argon and Oxygen gas (both 99.999% purity). Argon flow rate was 90 standard cubic centimeter per minute (sccm) and oxygen flow rate was 15 sccm. The Aluminum was sputtered at no more than 2.35 kilowatts for 2 hours. After 2 hours, the chamber was vented, and the Aluminum target was replaced. The chamber was pumped down to a base pressure of about $8.8 \times 10^{6}$ Torr. Aluminum was reactively sputtered at a pressure of about 10 mTorr using Argon and Oxygen gas (both 99.999% purity). Argon flow rate was 90 sccm and oxygen flow rate was 15 sccm. The Aluminum was sputtered at 4.5 kilowatts for 20 hours to create a thin film coating of an aluminum oxide on the surface of the beads. The coated beads were filtered through a series of sieves and a 400-mesh filter serving as the final filtration.

Example 1B

Example 1B used the same materials as Example 1A. Chemisnow SX-130H, a cross-linked polystyrene bead, (commercially available from Soken Chemical and Engineering Co., Ltd, Japan) is reported to have a mean particle size of 1.3 μm (per supplier web site). Wacker HDKH18 fumed silica was mixed into to the SX-130H (1% concentration, by weight). The mixed SX-130H beads (226 g) were introduced into a vacuum chamber (commercially available from Sierra Applied Sciences) equipped with a 2000 mL particle agitator and a 5-inch by 12-inch by 0.5-inch 1100 Aluminum Alloy sputtering target and cathode. During deposition, the particle agitator was operated at about 4 rpm. The chamber was pumped down to a base pressure of about $2.8 \times 10^{-5}$ Torr. Aluminum was reactively sputtered at a pressure of about 10 mTorr using Argon and Oxygen gas (both 99.999% purity). Argon flow rate was 90 sccm and Oxygen flow rate was 15 sccm. The Aluminum was sputtered at 3 kilowatts for 14 hours to create a thin film coating of an aluminum oxide on the surface of the beads. The coated beads were filtered through a series of sieves and a 400-mesh filter serving as the final filtration.

Example 1C

Chemisnow SX-130H, a cross-linked polystyrene bead, (commercially available from Soken Chemical and Engineering Co., Ltd, Japan) is reported to have a mean particle size of 1.3 μm (per supplier web site). A 3M nano-silica was mixed into to the SX-130H (1% concentration, by weight). The mixed SX-130H beads (100 g) were introduced into a vacuum chamber (commercially available from Sierra Applied Sciences) equipped with a 300 mL particle agitator and a 5-inch by 12-inch by 0.5-inch 1100 Aluminum Alloy sputtering target and cathode. During deposition, the particle agitator was operated at about 4 rpm. The chamber was pumped down to a base pressure of about $3.4 \times 10^{-7}$ Torr. Aluminum was reactively sputtered at a pressure of about 10 m Torr using Argon and Oxygen gas (both 99.999% purity). Argon flow rate was 90 sccm and oxygen flow rate was 15 sccm. The Aluminum was sputtered at 4.5 kilowatts for 20 hours to create a thin film coating of an aluminum oxide on the surface of the beads. The coated beads were filtered through a series of sieves and a 400-mesh filter serving as the final filtration.

Example 2

Chemisnow SX-350H, a cross-linked polystyrene bead, (commercially available from Soken Chemical and Engineering Co., Ltd, Japan) is reported to have a mean particle size of 3.5 μm (per supplier web site). Wacker HDKH18 fumed silica was mixed into to the SX-350H (1% concentration, by weight). The mixed SX-350H beads (102 g) were introduced into a vacuum chamber (commercially available from Sierra Applied Sciences) equipped with a 2000 mL particle agitator and a 5-inch by 8-inch by 0.5-inch 1100 Aluminum Alloy sputtering target and cathode. The chamber was pumped down to a base pressure of about $3 \times 10^{6}$ Torr. During deposition, the particle agitator was operated at about 4 rpm. Aluminum was reactively sputtered at a pressure of about 10 m Torr using Argon and Oxygen gas (both 99.999% purity). Argon flow rate was 90 sccm and oxygen flow rate was 15 sccm. The Aluminum was sputtered at 3 kilowatts for 20 hours to create a thin film coating of an aluminum oxide on the surface of the beads. The coated beads were filtered through a series of sieves and a 400-mesh filter serving as the final filtration.

Example 3

Chemisnow SX-130H, a cross-linked polystyrene bead, (commercially available from Soken Chemical and Engineering Co., Ltd, Japan) is reported to have a mean particle size of 1.3 μm (per supplier web site). Wacker HDKH18 fumed silica was mixed into to the SX-130H (1% concentration, by weight). The mixed SX-130H beads (75 g) were introduced into a vacuum chamber (commercially available from Sierra Applied Sciences) equipped with a 300 mL particle agitator and a 5-inch by 8-inch by 0.5-inch oxygen free high conductivity Copper sputtering target and cathode. The chamber was pumped down to a base pressure of about $1\times10^{-6}$ Torr. During deposition, the particle agitator was operated at about 4 rpm. Copper was sputtered at a pressure of about 10 mTorr using an Argon flow rate of 100 sccm. The Copper was sputtered at 1.5 kilowatts for 10 hours to create a thin film coating of a copper oxide on the surface of the beads. The coated beads were filtered through a series of sieves and a 400-mesh filter serving as the final filtration.

Example 4

Chemisnow SX-130H, a cross-linked polystyrene bead, (commercially available from Soken Chemical and Engineering Co., Ltd, Japan) is reported to have a mean particle size of 1.3 μm (per supplier web site). Wacker HDKH18 fumed silica was mixed into to the SX-130H (1% concentration, by weight). The mixed SX-130H beads (79 g) were introduced into a vacuum chamber (commercially available from Sierra Applied Sciences) equipped with a 300 mL particle agitator and a 5-inch by 8-inch by 0.5-inch 304 Stainless Steel (SS304) sputtering target and cathode. The chamber was pumped down to a base pressure of about $1.7\times10^{5}$ Torr. During deposition, the particle agitator was operated at about 4 rpm. SS304 was sputtered at a pressure of about 5 mTorr using an Argon flow rate of 100 sccm. The SS304 was sputtered at 3 kilowatts for 3.67 hours to create a thin film coating of SS304 on the surface of the beads. The coated beads were filtered through a series of sieves and a 400-mesh filter serving as the final filtration.

Estimating the Thickness of the Metalized Layer

The thickness of the metalized layer was indirectly determined using density measurement data. Using a Micromeritics 1340 Helium Pycnometer, the density of metal-coated and uncoated particles was measured. Using these density values, as well as the assumed density of the thin film coating (2.7 gram per cubic centimeter (g/cc) for bulk aluminum), and average particle size (1.3 μm or 3.5 μm, provided by vendor), geometrical calculations were performed to estimate the thickness of evenly distributed coatings on spherical particle substrates. The coatings are known to be aluminum-rich, so 2.7 g/cc was used to approximate the coating density.

The calculated layer thickness for these light absorbing particles are listed in Table 1 provided below.

TABLE 1

| Light Absorbing Particles | Layer Thickness (nm) |
|---|---|
| Example 1A | 6 |
| Example 1B | 2 |
| Example 1C | 5-10 |
| Example 2 | 10 |
| Example 3 | 6 |
| Example 4 | 3 |

Light Absorbing Material 250

Example 5

Resin included the following materials: 30 parts of Example 1A and 70 parts of a clear resin masterbatch. The clear resin masterbatch was included of the following materials: 91 parts Ebecryl 350 (Allnex USA Inc., Alpharetta, GA, USA), 6.5 parts SR-285 (Sartomer Company, Exton, PA, USA), 1.25 parts Darocur 1173 photoinitiator (BASF Corporation, Wyandotte, MI, USA), and 1.25 parts Irgacure 819 photoinitiator (BASF Corporation, Wyandotte, MI, USA). The resin was tumble mixed at room temperature for at least 10 hours.

Example 6

Resin included the following materials: 30 parts of Example 1B and 70 parts of same clear resin masterbatch used in Example 5. The resin was tumble mixed at room temperature for at least 10 hours.

Example 7

Resin included the following materials: 30 parts of Example 3 and 70 parts of same clear resin masterbatch used in Example 5. The resin was tumble mixed at room temperature for at least 10 hours.

Example 8

Resin included the following materials: 30 parts of Example 4 and 70 parts of same clear resin masterbatch used in Example 5. The resin was tumble mixed at room temperature for at least 10 hours.

Example 9

Resin included the following materials: 26 parts of Example 1A, 4 parts of Example 2 and 70 parts of same clear resin masterbatch used in Example 5. The resin was tumble mixed at room temperature for at least 10 hours.

Example 10

Resin included the following materials: 28 parts of Example 1B and 72 parts of same clear resin masterbatch used in Example 5. The resin was tumble mixed at room temperature for at least 10 hours.

Example 11

Resin included the following materials: 32 parts of Example 1B and 68 parts of same clear resin masterbatch used in Example 5. The resin was tumble mixed at room temperature for at least 10 hours.

Example 12

Resin included the following materials: 30 parts of Example 1B, 2 parts of Chemisnow SX-130H beads (as received from supplier) and 68 parts of same clear resin masterbatch used in Example 5. The resin was tumble mixed at room temperature for at least 10 hours.

Example 13

Resin included the following materials: 30 parts of Example 1C and 70 parts of same clear resin masterbatch used in Example 5. The resin was tumble mixed at room temperature for at least 10 hours.

Example 14

Resin included the following materials: 30 parts of Example 1C, 1 part of 9B1173 carbon black pigment paste (Penn Color Inc., Doylestown, PA, USA) and 69 parts of same clear resin masterbatch used in Example 5. The resin was tumble mixed at room temperature for at least 10 hours.

Example 15

Resin included the following materials: 30 parts of Example 1C, 2 parts of 9B1173 carbon black pigment paste (Penn Color Inc., Doylestown, PA, USA) and 68 parts of same clear resin masterbatch used in Example 5. The resin was tumble mixed at room temperature for at least 10 hours.

Comparative Example 1

Resin was included of the following materials: 20 parts of 9B1173 carbon black pigment paste (Penn Color Inc., Doylestown, PA, USA) and 80 parts of the same clear resin masterbatch used in Example 5.

Preparation of Microstructured Layer (100)

Structured films, for example the microstructured layer 100 shown in FIG. 1, were made by molding and ultraviolet light (UV) curing a visible wavelength transparent photopolymerizable composition on a 0.100 mm gauge, polycarbonate (PC) substrate film. For these structured films, a cylindrically shaped metal roll with finely detailed channels cut into its outer surface served as the mold. The resinous mixture was first introduced onto the PC substrate film and then pressed firmly against the metal roll in order to completely fill the mold. Upon polymerization the structured film was removed from the mold. The resulting structure in the cured resin was a series of evenly spaced channels, each having a nominally trapezoidal cross-section. FIG. 1 is representative of such a structured film.

Preparation of Light Control Films

The light absorbing material 250 described earlier was filled into the grooves between the transparent channels of the structured layer prepared by the method described above. Excess light absorbing material was wiped from the outward-facing surfaces of the transparent channels using a doctor blade. The light absorbing material filled channels were then cured using UV radiation, resulting in a light control film similar to that shown in FIG. 2.

Characterization of the Light Control Films

Relative Brightness Ratio (RBR)

Relative Brightness Ratio (RBR) of the exemplary light control films were measured using an Eldim 80 Conoscope (Eldim Corp., France). The exemplary LCFs were placed on top of a diffusely transmissive hollow light box. The exemplary LCFs were oriented such that the base layer 111 faced towards the detector (away from the light source). The luminance (cd/m²) (brightness) profiles of the light box with the LCFs were measured and the ratio of this value to the value obtained without the LCFs is reported herein as the RBR.

The diffuse transmission of the light box can be described as Lambertian. The light box was a six-sided hollow cube measuring approximately 12.5 cm×12.5 cm×11.5 cm (L×W×H) made from diffuse polytetrafluoroethylene (PTFE) plates of approximately 6 mm thickness. One face of the box was chosen as the sample surface. The hollow light box had a diffuse reflectance of about 0.83 measured at the sample surface (e.g., about 83%, averaged over the 400-700 nm wavelength range). During the RBR testing, the box was illuminated from within through a 1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough, MA and Auburn, NY).

An Eldim 80 Conoscope (Eldim Corp, France) was used to measure the luminance (brightness) profiles of the diffuse light source both with and without the LCFs. The RBR values of exemplary LCFs at incidence angles measured perpendicular to the louver direction (perpendicular to the light absorbing regions) are represented in FIGS. 11, 12, 13, 14, 15, and 16. The axial brightness (0Deg_B) was the brightness measured perpendicular to the surface of the LCF. The 40 Degrees VA brightness (+/−40Deg_B) was the brightness measured at +/−40 Degrees incidence angle. The RBR values at these specific angles are shown in Table 2.

Table 2 represents a summary of various Example LCFs described in Examples. Light absorbing material description used to construct each Example LCF and the RBR of those LCF at 0 degrees and +/−40 degrees are tabulated below.

TABLE 2

| LCF Description | Absorbing Resin Description | 0Deg_B (%) | −40Deg_B (%) | +40Deg_B (%) |
|---|---|---|---|---|
| Example 16 | Example 5 | 80.8 | 5.8 | 9.3 |
| Example 17 | Example 6 | 82.7 | 8.8 | 11.4 |
| Example 18 | Example 7 | 84.2 | 10.3 | 13.1 |
| Example 19 | Example 8 | 84.1 | 13.7 | 18.1 |
| Example 20 | Example 9 | 83.0 | 9.4 | 13.5 |
| Example 21 | Example 10 | 82.5 | 9.8 | 12.6 |
| Example 22 | Example 11 | 81.9 | 8.0 | 9.7 |
| Example 23 | Example 12 | 82.3 | 10.7 | 14.4 |
| Example 24 | Example 13 | 83.4 | 14.6 | 12.6 |
| Example 25 | Example 14 | 82.5 | 9.9 | 14.7 |
| Example 26 | Example 15 | 81.8 | 2.9 | 2.0 |
| Comp Example 2 | Comp Example 1 | 82.7 | 10.8 | 14.4 |

Example 16

Figure 12:
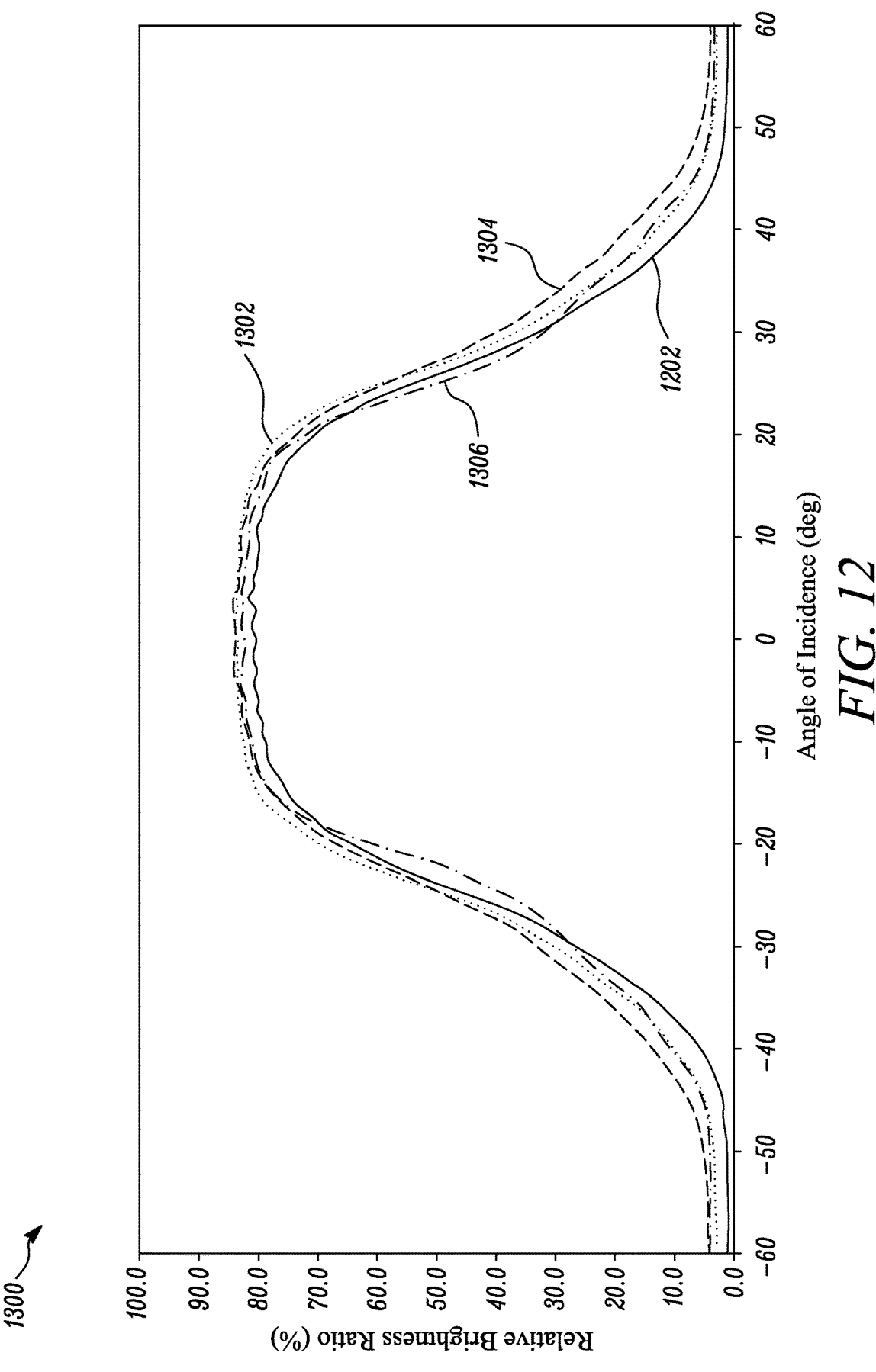
FIG. 12 is an exemplary graph illustrating RBR versus angle of incidence for various LCFs.
Figure 13:
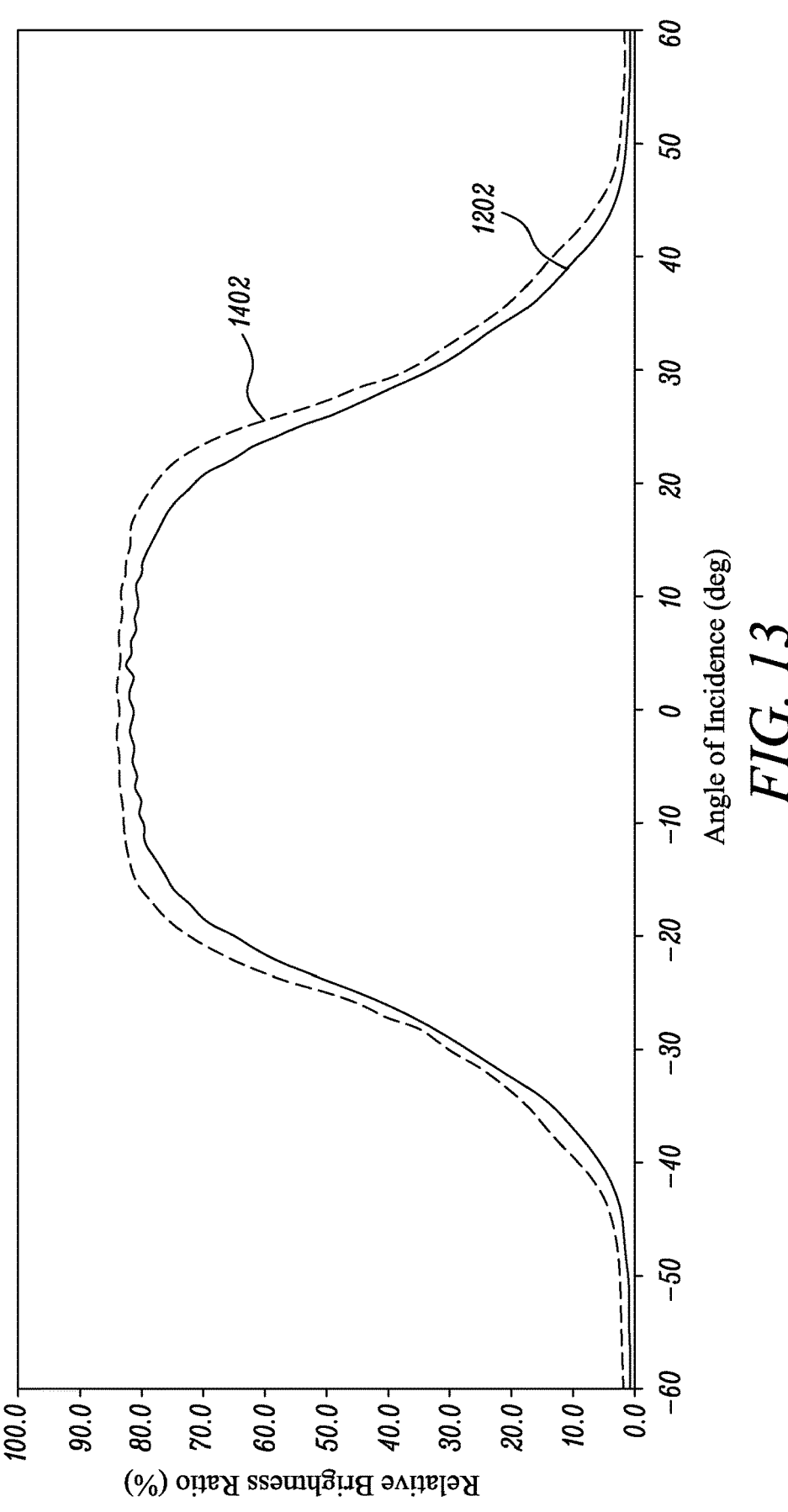
FIG. 13 is an exemplary graph illustrating RBR versus angle of incidence for various LCFs.
Figure 15:
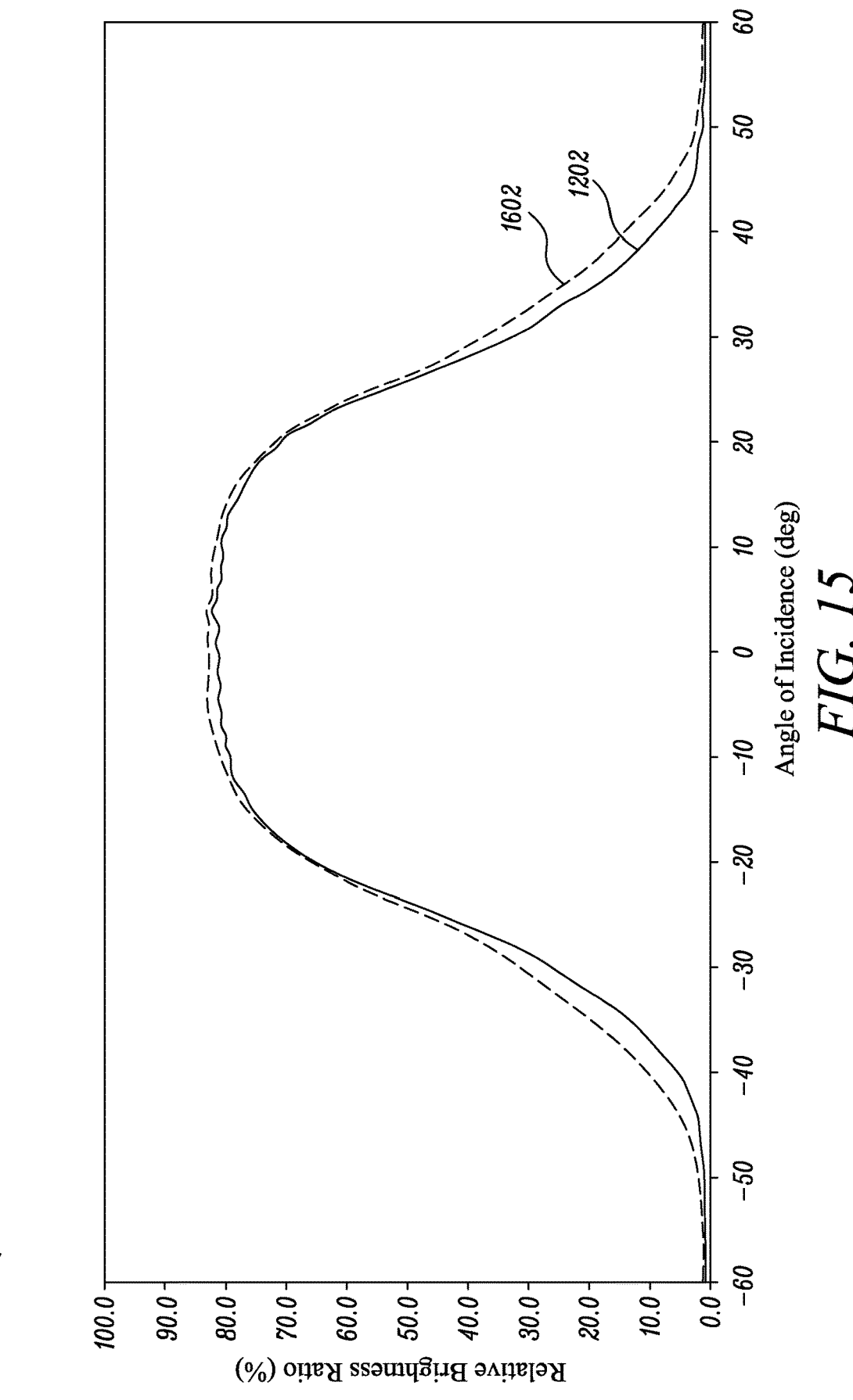
FIG. 15 is an exemplary graph illustrating RBR versus angle of incidence for various LCFs.

The RBR values of Example 16 for different incidence angles measured perpendicular to the louver direction (perpendicular to light absorbing regions) are depicted in a graph 1200 of FIG. 12, a graph 1300 of FIG. 12, a graph 1400 of FIG. 13 and a graph 1600 of FIG. 15 by a curve 1202. The RBR values of Example 16 at axial brightness (0Deg_B) and 40 Degrees VA brightness (+/−40Deg_B) are provided below:

(a) 0Deg_B RBR=80.8%;
(b) +40Deg_B RBR=9.3%; and
(c) −40Deg_B RBR=5.8%.

Example 17

Figure 11:
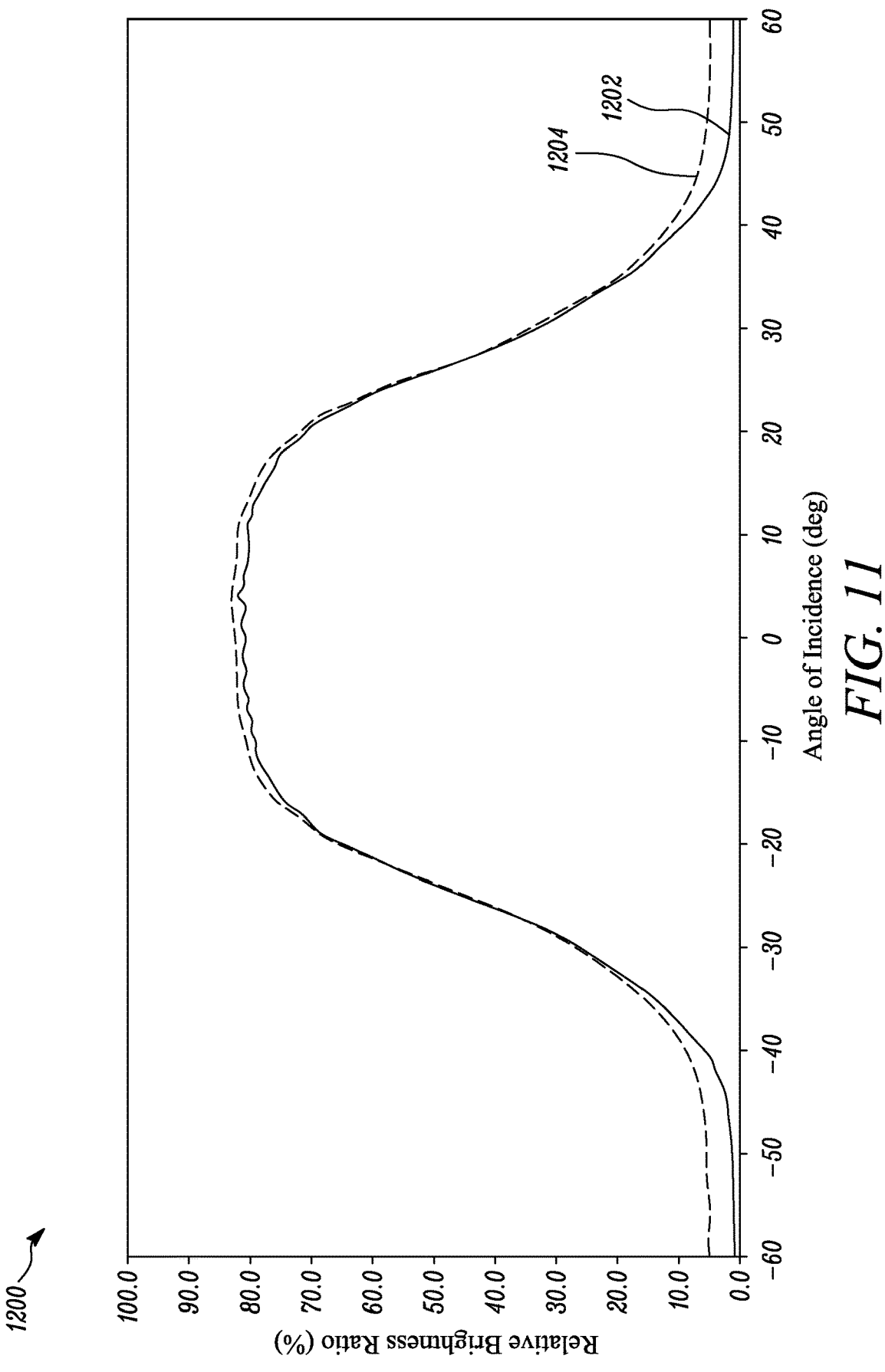
FIG. 11 is an exemplary graph illustrating relative bright-ness ratio (RBR) versus angle of incidence for various LCFs.
Figure 14:
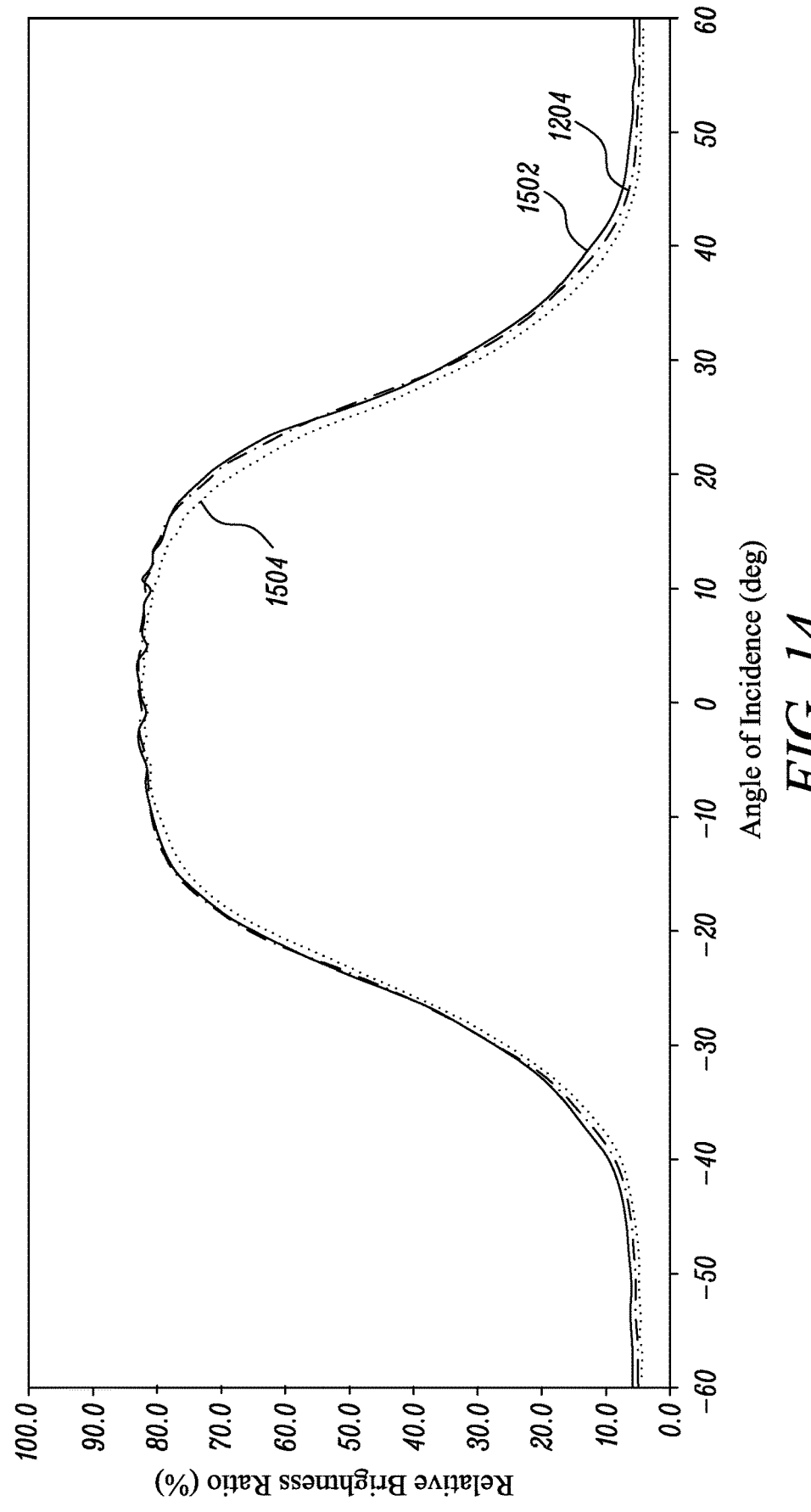
FIG. 14 is an exemplary graph illustrating RBR versus angle of incidence for various LCFs.

The RBR values of Example 17 for different incidence angles measured perpendicular to the louver direction (perpendicular to light absorbing regions) are depicted in the graph 1200 of FIG. 11 and a graph 1500 of FIG. 14 by a curve 1204. The RBR values of Example 17 at axial brightness (0Deg_B) and 40 Degrees VA brightness (+/−40Deg_B) are provided below:

(a) 0Deg_B RBR=82.78%;
(b) +40Deg_B RBR=11.4%; and
(c) −40Deg_B RBR=8.8%.

Example 18

The RBR values of Example 18 for different incidence angles measured perpendicular to the louver direction (perpendicular to light absorbing regions) are depicted in the graph 1300 of FIG. 12 by a curve 1302. The RBR values of Example 18 at axial brightness (0Deg_B) and 40 Degrees VA brightness (+/−40Deg_B) are provided below:

(a) 0Deg_B RBR=84.2%;
(b) +40Deg_B RBR=13.1%; and
(c) −40Deg_B RBR=10.3%.

Example 19

The RBR values of Example 19 for different incidence angles measured perpendicular to the louver direction (perpendicular to light absorbing regions) are depicted in the graph 1300 of FIG. 12 by a curve 1304. The RBR values of Example 19 at axial brightness (0Deg_B) and 40 Degrees VA brightness (+/−40Deg_B) are provided below:

(a) 0Deg_B RBR=84.1%;
(b) +40Deg_B RBR=18.1%; and
(c) −40Deg_B RBR=13.7%.

Example 20

The RBR values of Example 20 for different incidence angles measured perpendicular to the louver direction (perpendicular to light absorbing regions) are depicted in the graph 1400 of FIG. 13 by a curve 1402. The RBR values of Example 20 at axial brightness (0Deg_B) and 40 Degrees VA brightness (+/−40Deg_B) are provided below:

(a) 0Deg_B RBR=83.0%;
(b) +40Deg_B RBR=13.5%; and
(c) −40Deg_B RBR=9.4%.

Example 21

The RBR values of Example 21 for different incidence angles measured perpendicular to the louver direction (perpendicular to light absorbing regions) are depicted in the graph 1500 of FIG. 14 by a curve 1502. The RBR values of Example 21 at axial brightness (0Deg_B) and 40 Degrees VA brightness (+/−40Deg_B) are provided below:

(a) 0Deg_B RBR=82.5%;
(b) +40Deg_B RBR=12.6%; and
(c) −40Deg_B RBR=9.8%.

Example 22

The RBR values of Example 22 for different incidence angles measured perpendicular to the louver direction (perpendicular to light absorbing regions) are depicted in the graph 1500 of FIG. 14 by a curve 1504. The RBR values of Example 22 at axial brightness (0Deg_B) and 40 Degrees VA brightness (+/−40Deg_B) are provided below:

(a) 0Deg_B RBR=81.9%;
(b) +40Deg_B RBR=9.7%; and
(c) −40Deg_B RBR=8.0%.

Example 23

The RBR values of Example 23 for different incidence angles measured perpendicular to the louver direction (perpendicular to light absorbing regions) are depicted in the graph 1600 of FIG. 15 by a curve 1602. The RBR values of Example 23 at axial brightness (0Deg_B) and 40 Degrees VA brightness (+/−40Deg_B) are provided below:

(a) 0Deg_B RBR=82.3%;
(b) +40Deg_B RBR=14.4%; and
(c) −40Deg_B RBR=10.7%.

Example 24

Figure 16:
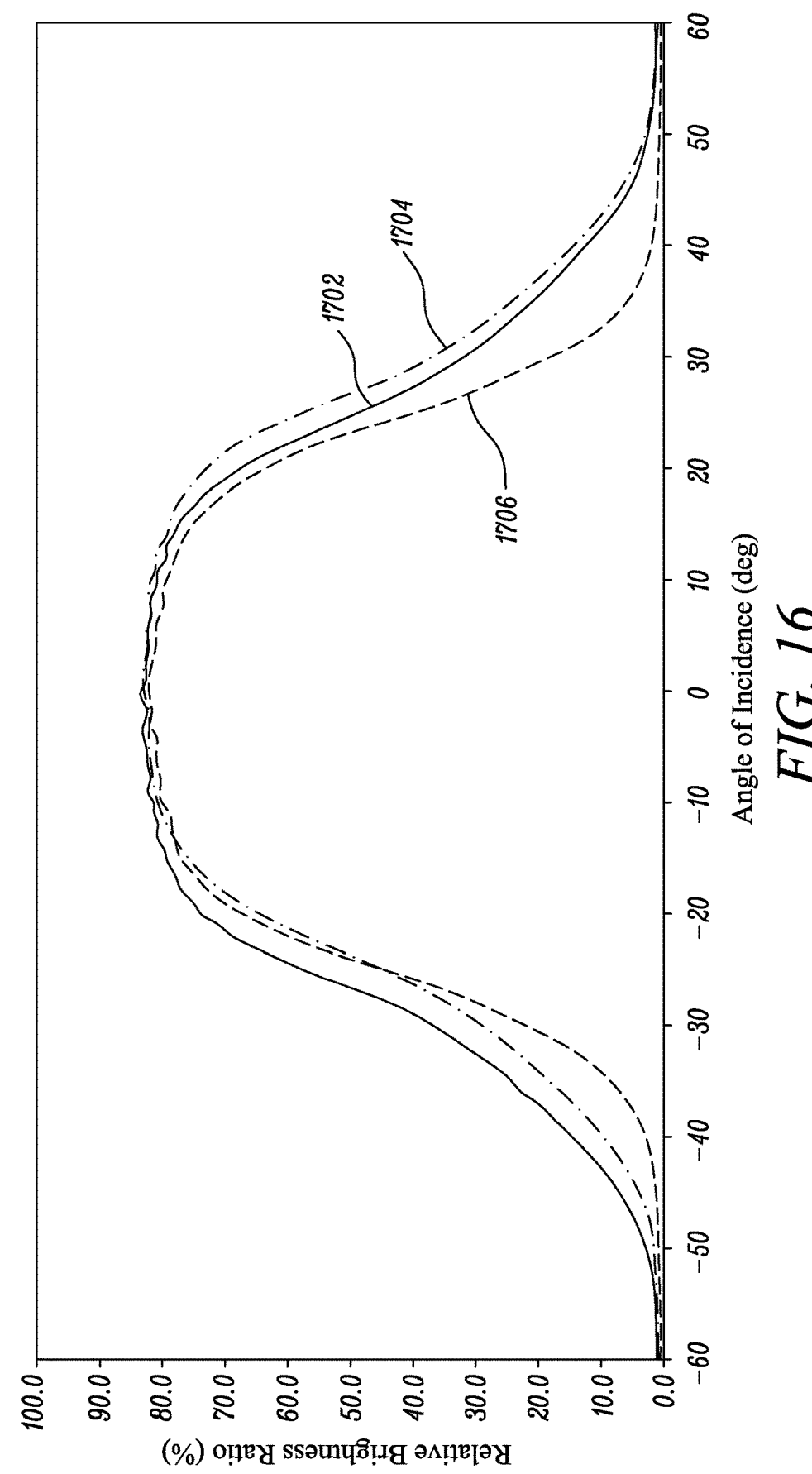
FIG. 16 is an exemplary graph illustrating RBR versus angle of incidence for various LCFs.

The RBR values of Example 24 for different incidence angles measured perpendicular to the louver direction (perpendicular to light absorbing regions) are depicted in a graph 1700 of FIG. 16 by a curve 1702. The RBR values of Example 24 at axial brightness (0Deg_B) and 40 Degrees VA brightness (+/−40Deg_B) are provided below:

(a) 0Deg_B RBR=83.4%;
(b) +40Deg_B RBR=12.6%; and
(c) −40Deg_B RBR=14.6%.

Example 25

The RBR values of Example 25 for different incidence angles measured perpendicular to the louver direction (perpendicular to light absorbing regions) are depicted in the graph 1700 of FIG. 16 by a curve 1704. The RBR values of Example 25 at axial brightness (0Deg_B) and 40 Degrees VA brightness (+/−40Deg_B) are provided below:

(a) 0Deg_B RBR=82.5%;
(b) +40Deg_B RBR=14.7%; and
(c) −40Deg_B RBR=9.9%.

Example 26

The RBR values of Example 26 for different incidence angles measured perpendicular to the louver direction (perpendicular to light absorbing regions) are depicted in the graph 1700 of FIG. 16 by a curve 1706. The RBR values of Example 25 at axial brightness (0Deg_B) and 40 Degrees VA brightness (+/−40Deg_B) are provided below:

(a) 0Deg_B RBR=81.8%;
(b) +40Deg_B RBR=2.0%; and
(c) −40Deg_B RBR=2.9%.

Comparative Example 2

The RBR values of Comparative Example 2 for different incidence angles measured perpendicular to the louver direction (perpendicular to light absorbing regions) are depicted in the graph 1300 of FIG. 12 by a curve 1306. The RBR values of Comparative Example 2 at axial brightness (0Deg_B) and 40 Degrees VA brightness (+/−40Deg_B) are provided below:

(a) 0Deg_B RBR=82.7%;

(b) +40Deg_B RBR=14.4%; and (c) −40Deg_B RBR=10.8%.

Figure 17B:
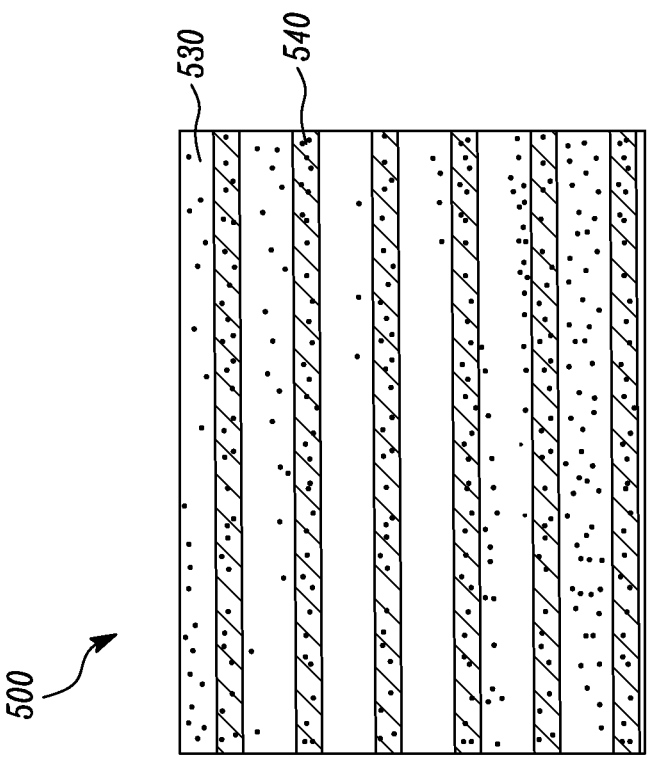
FIGS. 17A-17B show schematic top views of an LCF according to an embodiment of the present disclosure and a conventional LCF, respectively.
Figure 17A:
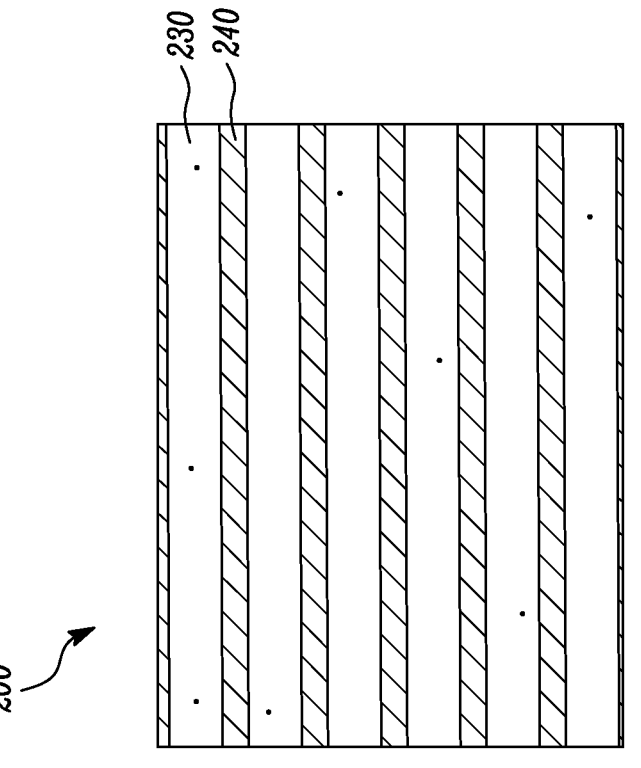

FIGS. 17A and 17B illustrate schematic top views of the LCF 200 and an LCF 500. The LCF 500 is substantially similar to the LCF 200. The LCF 500 includes a plurality of light transmissive regions 530 a plurality of light absorbing regions 540. However, the plurality of light absorbing regions 540 of the LCF 500 includes the light absorbing material described in Comparative Example 1. In other words, the LCF 500 corresponds to the light control film described in Comparative Example 2. Similarly, the LCF 200 corresponds to the light control film described in Example 19. Specifically, the plurality of light absorbing regions 240 of the LCF 200 includes the light absorbing material described in Example 8.

Keyence microscope was used to image the coated surface of two different light control films (i.e., the LCFs 200, 500). The surface images of Example 19 (i.e., the LCF 200) and Comparative Example 2 (i.e., the LCF 500) are shown in FIGS. 17A and 17B, respectively. There is less residual light absorbing material on an upper land, for example, the structured surface 110 of the microstructured layer 100 (shown in FIG. 1) of the LCF 200, in the case of Example 19 as compared to an upper land of Comparative Example 2, for example, a structured surface of the LCF 500. Less light absorbing material residue on the upper land of is generally associated with better quality light control film. Presence of light absorbing material residue may cosmetically degrade a viewing quality or a viewing clarity of a displayed image. If too much light absorbing material residue is present at the upper land, the 0Deg_B RBR may be reduced and the viewing clarity through the LCF may be reduced. Neither of these outcomes are desirable in a display grade LCF.

The LCFs of the present disclosure may therefore provide a desired privacy function while improving a viewing quality or a viewing clarity within a desired viewing angle as compared to conventional LCFs including only carbon black/light absorbing dye as a light absorbing material.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A light control film comprising:
  a microstructured layer comprising a plurality of microstructures defining a plurality of grooves therebetween; and
  a light absorbing material disposed in each of the plurality of grooves, the light absorbing material comprising a plurality of first particles, wherein each first particle comprises:
  a polymeric bead comprising an outer surface; and
  an outer layer disposed on the outer surface of the polymeric bead, wherein the outer layer comprises a metal compound; wherein the light absorbing material further comprises a plurality of second particles, and wherein each second particle comprises an uncoated polymeric bead, wherein a weight ratio of the plurality of first particles to the plurality of second particles is from about 10 to about 50.

2. The light control film of claim 1, wherein the polymeric bead comprises a cross-linked polymer.

3. The light control film of claim 2, wherein the cross-linked polymer comprises polystyrene.

4. The light control film of claim 2, wherein the cross-linked polymer comprises polymethyl methacrylate (PMMA).

5. The light control film of claim 1, wherein the metal compound comprises at least one of an aluminum oxide, a copper oxide, and a stainless steel.

6. The light control film of claim 1, wherein the plurality of microstructures forms a plurality of light transmissive regions, and wherein the plurality of grooves at least partially filled with the light absorbing material forms a plurality of light absorbing regions.

7. The light control film of claim 6, further comprising a light input surface and a light output surface opposite to the light input surface, wherein the plurality of light transmissive regions and the plurality of light absorbing regions are disposed between the light input surface and the light output surface.

8. The light control film of claim 1, wherein the outer layer of the polymeric bead is formed by vapor depositing a metal on the outer surface of the polymeric bead to form the metal compound.

9. A method of manufacturing a light control film, the method comprising:
  providing a plurality of polymeric beads, wherein each polymeric bead comprises an outer surface;
  forming a plurality of first particles by vapor depositing a metal on the outer surfaces of the plurality of polymeric beads, wherein each first particle comprises an outer layer of a metal compound disposed on the outer surface of the corresponding polymeric bead; and
  forming a light absorbing material by mixing the plurality of first particles with a binder; wherein forming the light absorbing material further comprises mixing a plurality of second particles with the binder, and wherein each second particle comprises an uncoated polymeric bead, and wherein a weight ratio of the plurality of first particles to the plurality of second particles is from about 10 to about 50.

10. The method of claim 9, wherein forming the light absorbing material further comprises mixing a plurality of third particles with the binder, and wherein each third particle comprises at least one of a carbon black and a visible light absorbing dye.

11. The method of claim 10, wherein a weight ratio of the plurality of first particles to the plurality of third particles is from about 10 to about 200.

12. The method of claim 9, wherein the polymeric bead comprises a cross-linked polymer.

13. The method of claim 12, wherein the cross-linked polymer comprises polystyrene.

14. The method of claim 12, wherein the cross-linked polymer comprises polymethyl methacrylate (PMMA).

15. The method of claim 9, wherein the metal compound comprises at least one of an aluminum oxide, a copper oxide, and a stainless steel.

16. The method of claim 9, further comprising:

providing a microstructured layer comprising a plurality of microstructures defining a plurality of grooves therebetween, wherein the plurality of microstructures form a plurality of light transmissive regions; and filling the plurality of grooves with the light absorbing material to form a plurality of light absorbing regions.

* * * * *